US012112458B2

(12) United States Patent
Liu

(10) Patent No.: US 12,112,458 B2
(45) Date of Patent: Oct. 8, 2024

(54) REMOVAL OF OBJECTS FROM IMAGES

(71) Applicant: QUALCOMM Incorporated, San Diego, CA (US)

(72) Inventor: Shizhong Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/862,272

(22) Filed: Jul. 11, 2022

(65) Prior Publication Data

US 2024/0013351 A1    Jan. 11, 2024

(51) Int. Cl.
| | |
|---|---|
| G06T 5/77 | (2024.01) |
| G06T 5/50 | (2006.01) |
| G06T 7/00 | (2017.01) |
| G06T 7/11 | (2017.01) |
| G06T 7/174 | (2017.01) |

(Continued)

(52) U.S. Cl.
CPC .......... *G06T 5/77* (2024.01); *G06T 5/50* (2013.01); *G06T 7/11* (2017.01); *G06T 7/174* (2017.01); *G06T 7/20* (2013.01); *G06T 7/97* (2017.01); *H04N 23/632* (2023.01); *H04N 23/80* (2023.01); *G06T 2207/20092* (2013.01)

(58) Field of Classification Search
CPC ...... H04N 5/2621; H04N 23/63; H04N 5/272; H04N 23/632; H04N 23/64; H04N 23/80; H04N 23/951; G06T 5/005; G06T 2207/10004; G06T 2207/10024; G06T 2207/20021; G06T 2207/20092; G06T 2207/30204; G06T 5/50; G06T 7/254; G06T 7/20; G06T 7/11; G06T 7/97; G06T 7/174; G06T 5/77; G06F 18/22
See application file for complete search history.

(56) References Cited

U.S. PATENT DOCUMENTS

| | | | |
|---|---|---|---|
| 2012/0320237 A1 | 12/2012 | Liu et al. | |
| 2015/0213636 A1* | 7/2015 | Herling | G06T 5/005 |
| | | | 382/218 |

(Continued)

FOREIGN PATENT DOCUMENTS

KR    20100013700 A    2/2010

OTHER PUBLICATIONS

International Search Report and Written Opinion—PCT/US2023/069306—ISA/EPO—Sep. 27, 2023.

*Primary Examiner* — Antoinette T Spinks
(74) *Attorney, Agent, or Firm* — QUALCOMM Incorporated

(57) ABSTRACT

Systems and techniques are provided for adjusting objects in images. For example, a process can include obtaining a first image of a scene from a camera. The scene can include a first object positioned at a first position and a second object positioned at a second position. The process can include obtaining a second image of the scene from the camera. The second image of the scene can include the first object positioned at the first position and the second object positioned at a third position different from the second position. The process can include generating an adjusted second image based on the second image. The adjusted second image can include the first object positioned at the first position. The second object at the third position is removed from the adjusted second image. The process can include displaying the adjusted second image on a display.

44 Claims, 9 Drawing Sheets

(51) Int. Cl.
*G06T 7/20* (2017.01)
*H04N 23/63* (2023.01)
*H04N 23/80* (2023.01)

(56) References Cited

U.S. PATENT DOCUMENTS

| | | | |
|---|---|---|---|
| 2015/0277706 A1* | 10/2015 | Chan | H04L 65/1089 |
| | | | 715/719 |
| 2015/0278986 A1* | 10/2015 | Edwin | G06T 11/60 |
| | | | 345/428 |
| 2016/0323505 A1 | 11/2016 | Zhou et al. | |
| 2018/0249091 A1 | 8/2018 | Ding et al. | |
| 2019/0228508 A1* | 7/2019 | Price | G06T 7/344 |
| 2021/0217145 A1* | 7/2021 | El-Khamy | G06T 5/50 |
| 2023/0353701 A1* | 11/2023 | Shukla | H04N 5/272 |

* cited by examiner

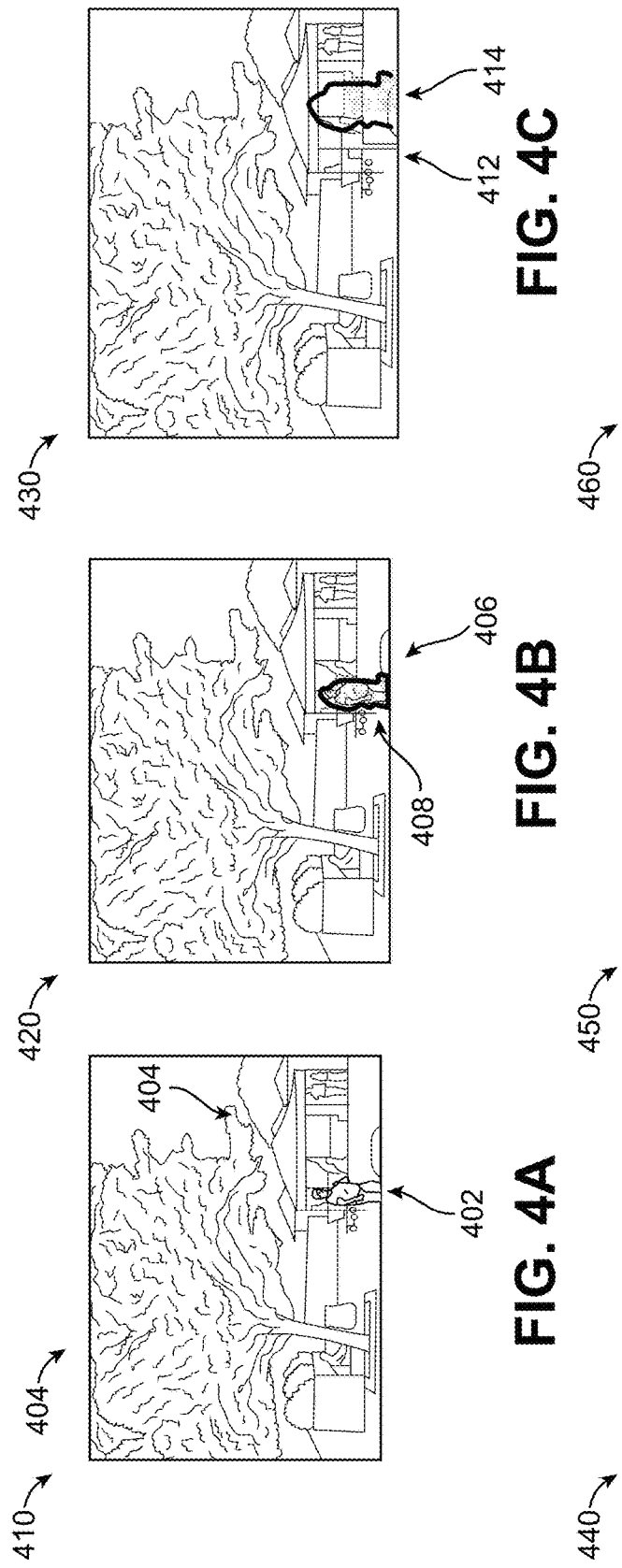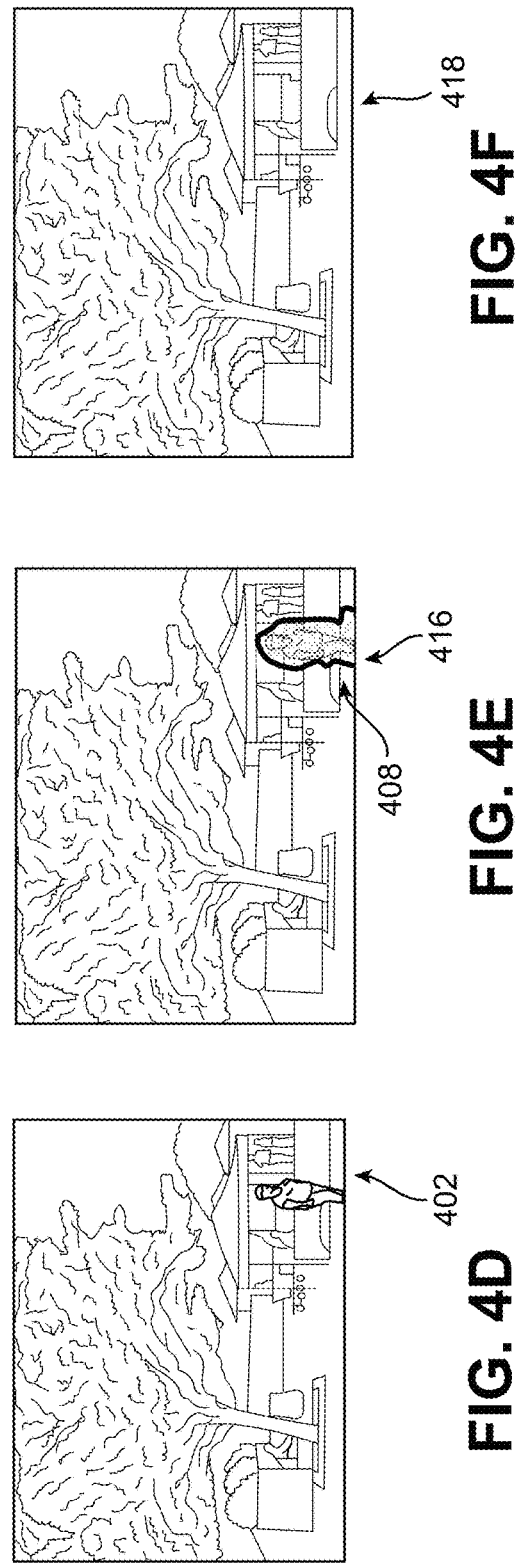

REMOVAL OF OBJECTS FROM IMAGES

FIELD

The present disclosure generally relates to image adjustment or modification. For example, aspects of the present disclosure are related to systems and techniques for removing objects from images.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

When using a device to capture an image of a scene, one or more objects may be present in the scene that are unwanted in a final captured image. For example, a user may wish to capture an image of specific tourists in front of a national monument and many passers-by may enter and exit the scene.

A user can attempt to capture an image of the scene at an exact moment where no passers-by are present in the scene. However, in some scenarios, a scene without unwanted object may not occur and/or may require a long waiting period.

BRIEF SUMMARY

Disclosed are systems, apparatuses, methods, and computer-readable media for adjusting objects in images. According to at least one example, a method is provided for adjusting objects in images. The method includes: obtaining a first image of a scene from a camera, wherein the scene includes a first object positioned at a first position and a second object positioned at a second position; obtaining a second image of the scene from the camera, wherein the second image of the scene includes the first object positioned at the first position and the second object positioned at a third position, the third position being different from the second position; generating an adjusted second image based on the second image, wherein the adjusted second image includes the first object positioned at the first position and the second object at the third position is removed from the adjusted second image; and displaying the adjusted second image on a display, wherein the first image of the scene and the adjusted second image comprise images captured independent of obtaining a capture input.

In another example, an apparatus for adjusting objects in images is provided that includes at least one memory and at least one processor coupled to the at least one memory. The at least one processor is configured to: obtain a first image of a scene from a camera, wherein the scene includes a first object positioned at a first position and a second object positioned at a second position; obtain a second image of the scene from the camera, wherein the second image of the scene includes the first object positioned at the first position and the second object positioned at a third position, the third position being different from the second position; generate an adjusted second image based on the second image, wherein the adjusted second image includes the first object positioned at the first position and the second object at the third position is removed from the adjusted second image; and display the adjusted second image on a display, wherein the first image of the scene and the adjusted second image comprise images captured independent of obtaining a capture input.

In another example, a non-transitory computer-readable medium is provided that has stored thereon instructions that, when executed by one or more processors, cause the one or more processors to: obtain a first image of a scene from a camera, wherein the scene includes a first object positioned at a first position and a second object positioned at a second position; obtain a second image of the scene from the camera, wherein the second image of the scene includes the first object positioned at the first position and the second object positioned at a third position, the third position being different from the second position; generate an adjusted second image based on the second image, wherein the adjusted second image includes the first object positioned at the first position and the second object at the third position is removed from the adjusted second image; and display the adjusted second image on a display, wherein the first image of the scene and the adjusted second image comprise images captured independent of obtaining a capture input.

In another example, an apparatus for adjusting objects in images is provided. The apparatus includes: means for obtaining a first image of a scene from a camera, wherein the scene includes a first object positioned at a first position and a second object positioned at a second position; means for obtaining a second image of the scene from the camera, wherein the second image of the scene includes the first object positioned at the first position and the second object positioned at a third position, the third position being different from the second position; means for generating an adjusted second image based on the second image, wherein the adjusted second image includes the first object positioned at the first position and the second object at the third position is removed from the adjusted second image; and means for displaying the adjusted second image on a display, wherein the first image of the scene and the adjusted second image comprise images captured independent of obtaining a capture input.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 4A through FIG. 4F are images illustrating example image adjustments, in accordance with some examples of the present disclosure;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Figure 1A:
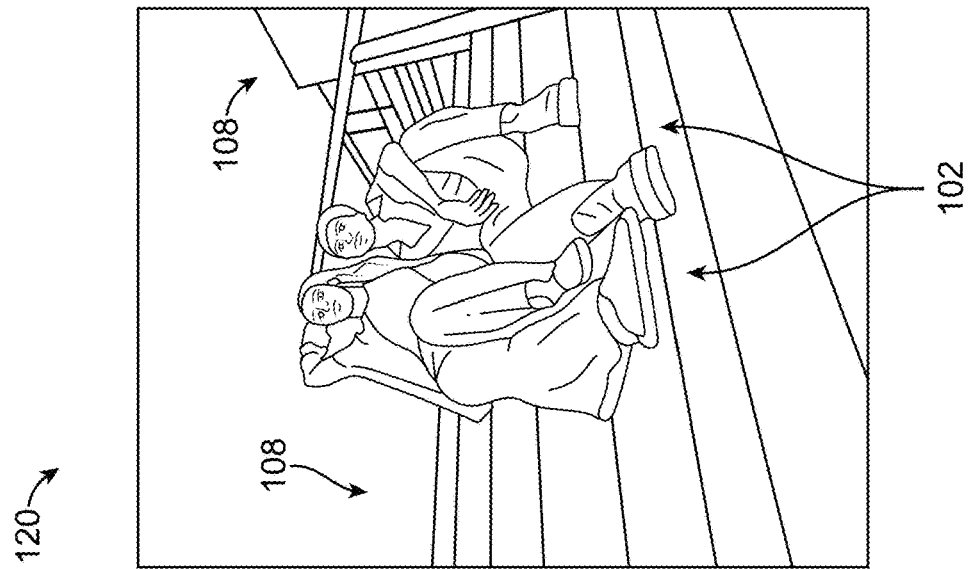
FIG. 1A through FIG. 1C are images depicting different fields of view in example images, in accordance with some examples of the present disclosure.
Figure 1B:
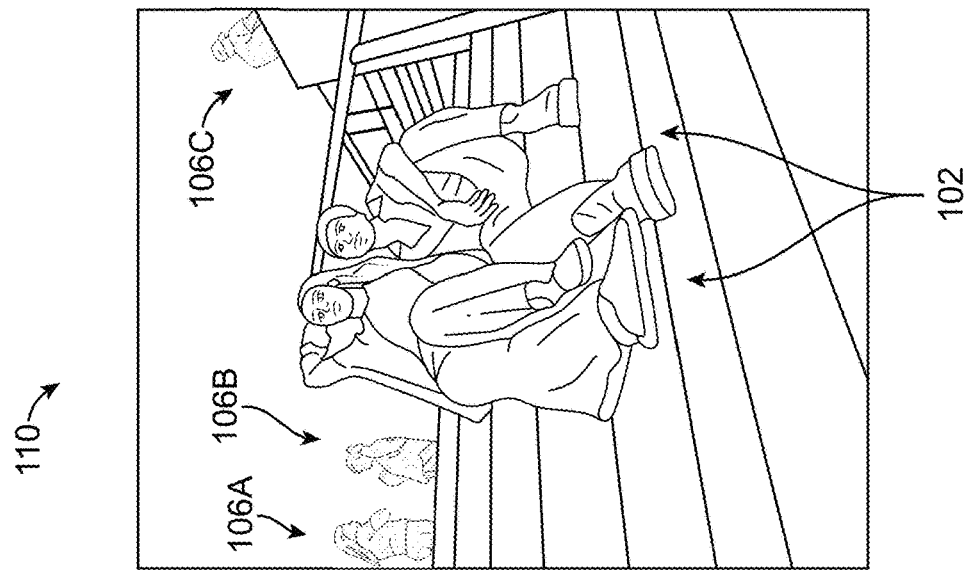
Figure 1C:
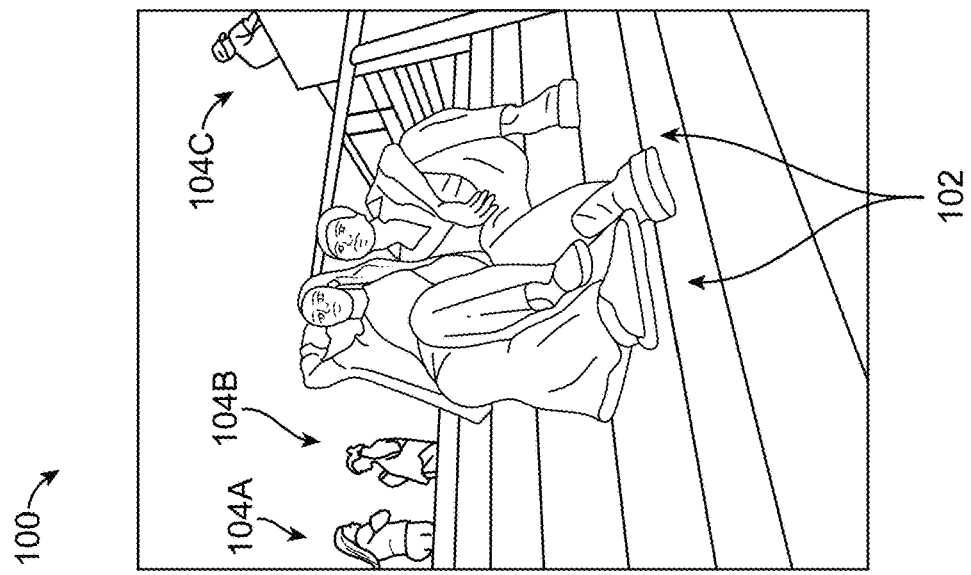

When capturing an image of a scene, unwanted objects (e.g., people, animals, vehicles, etc.) may be present in the scene in addition to a target object or objects (e.g., people animals, vehicles, structures, etc.). FIG. 1A-FIG. 1C are images illustrating a scene including unwanted objects and a process for removing the unwanted objects from an image of the scene. FIG. 1A is an image 100 of two people 102 seated on a stair case. In the image 100, the people 102 are the target objects (e.g., subject) desired to be captured in the scene of the image 100. In FIG. 1A, the image 100 also includes three people 104A, 104B, 104C positioned behind the people 102. In some cases, it may be desirable to remove the people 104A, 104B, 104C in the background of the image 100.

FIG. 1B illustrates a segmentation image 110 with the three people 104A, 104B, 104C of FIG. 1A depicted with segmentation outlines 106A, 106B, 106C. For example, the three people 104A, 104B, 104C can be selected (e.g., by a user input, by a machine learning model, etc.) and identified for removal from the segmentation image 110. In some cases, a segmentation process can be used to determine which pixels of the segmentation image 110 belong to each of the people 104A, 104B, 104C as indicated by the segmentation outlines 106A, 106B, 106C. In some cases, the segmentation illustrated in segmentation image 110 can be performed in whole or in part by a machine learning model. For example, a machine learning model can be trained to detect features in the segmentation image 110. In some cases, based on the detected features in the segmentation image 110, the machine learning model can classify objects in the segmentation image 110. Example classifications for the people 104A, 104B, 104C can include "person," "background object" or the like. In some cases, a user can select which objects (or classifications) in the segmentation image 110 to target for adjustment (e.g., zooming in).

In some aspects, adjusting the image 100 by removing the people 104A, 104B, 104C can leave behind an empty region in a resulting adjusted image. FIG. 1C illustrates an adjusted image 120 where the empty regions left behind by removal of the people 104A, 104B, 104C is filled in at the regions 108. In the illustrated example, the filled in regions 108 appear to include sky and clouds consistent with the background. In some cases, the portions of the adjusted image 120 can be filled using an inpainting process. For example, an inpainting process can attempt to fill in the empty regions of the adjusted image 120 with colors approximating (or estimating) the portion of the scene captured in the image 100 that were obscured by the people 104A, 104B, 104C. In one illustrative example, inpainting can be performed by interpolating and/or blending colors from pixels in the input image 100 neighboring the empty regions and applying the interpolated colors to the empty regions. In some cases, an outline of the removed objects (e.g., people 104A, 104B, 104C) can be visible after replacement of the empty regions with estimated color values. In some cases, an image adjustment technique (e.g., an inpainting process) can perform blending and smoothing around edges of the people 104A, 104B, 104C (e.g., along the segmentation outlines 106A, 106B, 106C).

In another illustrative example, one or more additional images (not shown) of the same scene or a portion of the same scene as segmentation image 110 may include portions of the scene occluded by people 104A, 104B, 104C in the segmentation image 110. In some examples, the empty regions created by removing unwanted objects 104A, 104B, 104C in segmentation image 110 can be filled by combining pixels from the one or more additional images with the image 100, adjusted image 120, one or more additional images, or any combination thereof. However, in some cases one or more additional images of the scene or a portion of the scene may not have been captured and/or stored. As a result, the technique of combining pixels from multiple images may not be available.

Systems and techniques are needed for identifying objects for removal from an image during an image capture process and removing the identified objects. For example, unwanted objects that appear in a preview image (e.g., displayed on a display) can be identified for removal prior to capturing an image of a scene (e.g., before a capture input is received). As a result, the preview image can match with a final captured image that is stored to memory and similarly has the unwanted objects removed.

Systems, apparatuses, processes (also referred to as methods), and computer-readable media (collectively referred to as "systems and techniques") are described herein for identifying objects for removal from an image during an image capture process and removing the identified objects. In some cases, after one or more unwanted objects are identified for removal, additional preview images can be adjusted to remove the unwanted objects prior to capturing. In some examples, when an image of the scene is captured (e.g., in response to a capture input), the unwanted objects can be removed from the scene prior to storing an adjusted image in storage. For example, a photographer may be able to see an preview image that shows the unwanted object removed before pressing a shutter (or providing any other type of capture input).

Figure 2:
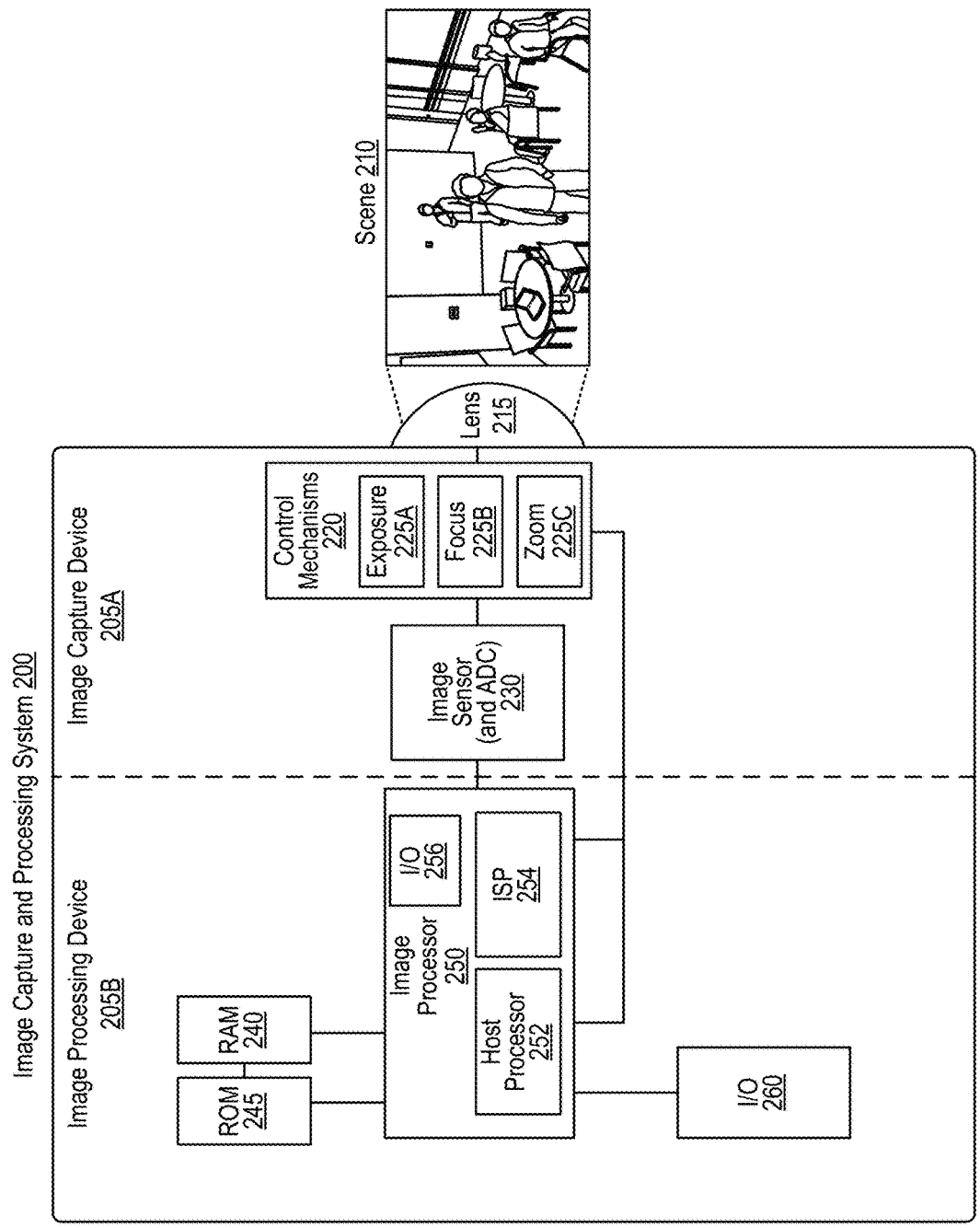
FIG. 2 is a block diagram illustrating an architecture of an image capture and processing device, in accordance with some examples of the present disclosure.

Various aspects of the techniques described herein will be discussed below with respect to the figures. FIG. 2 is a block diagram illustrating an architecture of an image capture and processing system 200. The image capture and processing system 200 includes various components that are used to capture and process images of scenes (e.g., an image of a scene 210). The image capture and processing system 200 can capture standalone images (or photographs) and/or can capture videos that include multiple images (or video frames) in a particular sequence. A lens 215 of the image capture and processing system 200 faces a scene 210 and receives light from the scene 210. The lens 215 bends the light toward the image sensor 230. The light received by the lens 215 passes through an aperture controlled by one or more control mechanisms 220 and is received by an image sensor 230.

The one or more control mechanisms 220 may control exposure, focus, and/or zoom based on information from the image sensor 230 and/or based on information from the image processor 250. The one or more control mechanisms 220 may include multiple mechanisms and components; for instance, the control mechanisms 220 may include one or more exposure control mechanisms 225A, one or more focus control mechanisms 225B, and/or one or more zoom control mechanisms 225C. The one or more control mechanisms 220 may also include additional control mechanisms besides those that are illustrated, such as control mechanisms controlling analog gain, flash, HDR, depth of field, and/or other image capture properties.

The focus control mechanism 225B of the control mechanisms 220 can obtain a focus setting. In some examples, focus control mechanism 225B store the focus setting in a memory register. Based on the focus setting, the focus control mechanism 225B can adjust the position of the lens 215 relative to the position of the image sensor 230. For example, based on the focus setting, the focus control mechanism 225B can move the lens 215 closer to the image sensor 230 or farther from the image sensor 230 by actuating a motor or servo (or other lens mechanism), thereby adjusting focus. In some cases, additional lenses may be included in the image capture and processing system 200, such as one or more microlenses over each photodiode of the image sensor 230, which each bend the light received from the lens 215 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 220, the image sensor 230, and/or the image processor 250. The focus setting may be referred to as an image capture setting and/or an image processing setting.

The exposure control mechanism 225A of the control mechanisms 220 can obtain an exposure setting. In some cases, the exposure control mechanism 225A stores the exposure setting in a memory register. Based on this exposure setting, the exposure control mechanism 225A can control a size of the aperture (e.g., aperture size or f/stop), a duration of time for which the aperture is open (e.g., exposure time or shutter speed), a sensitivity of the image sensor 230 (e.g., ISO speed or film speed), analog gain applied by the image sensor 230, or any combination thereof. The exposure setting may be referred to as an image capture setting and/or an image processing setting.

The zoom control mechanism 225C of the control mechanisms 220 can obtain a zoom setting. In some examples, the zoom control mechanism 225C stores the zoom setting in a memory register. Based on the zoom setting, the zoom control mechanism 225C can control a focal length of an assembly of lens elements (lens assembly) that includes the lens 215 and one or more additional lenses. For example, the zoom control mechanism 225C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 215 in some cases) that receives the light from the scene 210 first, with the light then passing through an afocal zoom system between the focusing lens (e.g., lens 215) and the image sensor 230 before the light reaches the image sensor 230. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 225C moves one or more of the lenses in the afocal zoom system, such as the negative lens and one or both of the positive lenses.

The image sensor 230 includes one or more arrays of photodiodes or other photosensitive elements. Each photodiode measures an amount of light that eventually corresponds to a particular pixel in the image produced by the image sensor 230. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 230) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 230 may alternately or additionally include opaque and/or reflective masks that block light from reaching certain photodiodes, or portions of certain photodiodes, at certain times and/or from certain angles, which may be used for phase detection autofocus (PDAF). The image sensor 230 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 220 may be included instead or additionally in the image sensor 230. The image sensor 230 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 250 may include one or more processors, such as one or more image signal processors (ISPs) (including ISP 254), one or more host processors (including host processor 252), and/or one or more of any other type of processor 910 discussed with respect to the computing system 900. The host processor 252 can be a digital signal processor (DSP) and/or other type of processor. In some implementations, the image processor 250 is a single integrated circuit or chip (e.g., referred to as a system-on-chip or SoC) that includes the host processor 252 and the ISP 254. In some cases, the chip can also include one or more input/output ports (e.g., input/output (I/O) ports 256), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 256 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 252 can communicate with the image sensor 230 using an I2C port, and the ISP 254 can communicate with the image sensor 230 using an MIPI port.

The image processor 250 may perform a number of tasks, such as de-mosaicing, color space conversion, image frame downsampling, pixel interpolation, automatic exposure (AE) control, automatic gain control (AGC), CDAF, PDAF, automatic white balance, merging of images to form an HDR image, image recognition, object recognition, feature recognition, receipt of inputs, managing outputs, managing memory, or some combination thereof. The image processor 250 may store image frames and/or processed images in random access memory (RAM) 140/3225, read-only memory (ROM) 145/920, a cache, a memory unit, another storage device, or some combination thereof.

Various input/output (I/O) devices 260 may be connected to the image processor 250. The I/O devices 260 can include a display screen, a keyboard, a keypad, a touchscreen, a trackpad, a touch-sensitive surface, a printer, any other output devices 935, any other input devices 945, or some combination thereof. In some cases, a caption may be input into the image processing device 205B through a physical keyboard or keypad of the I/O devices 260, or through a virtual keyboard or keypad of a touchscreen of the I/O devices 260. The I/O 260 may include one or more ports, jacks, or other connectors that enable a wired connection between the image capture and processing system 200 and one or more peripheral devices, over which the image capture and processing system 200 may receive data from the one or more peripheral device and/or transmit data to the one or more peripheral devices. The I/O 260 may include one or more wireless transceivers that enable a wireless connection between the image capture and processing system 200 and one or more peripheral devices, over which the image capture and processing system 200 may receive data from the one or more peripheral device and/or transmit data to the one or more peripheral devices. The peripheral devices may include any of the previously-discussed types of I/O devices 260 and may themselves be considered I/O devices 260 once they are coupled to the ports, jacks, wireless transceivers, or other wired and/or wireless connectors.

In some cases, the image capture and processing system 200 may be a single device. In some cases, the image capture and processing system 200 may be two or more separate devices, including an image capture device 205A (e.g., a camera) and an image processing device 205B (e.g., a computing device coupled to the camera). In some implementations, the image capture device 205A and the image processing device 205B may be coupled together, for example via one or more wires, cables, or other electrical connectors, and/or wirelessly via one or more wireless transceivers. In some implementations, the image capture device 205A and the image processing device 205B may be disconnected from one another.

As shown in FIG. 2, a vertical dashed line divides the image capture and processing system 200 of FIG. 2 into two portions that represent the image capture device 205A and the image processing device 205B, respectively. The image capture device 205A includes the lens 215, control mechanisms 220, and the image sensor 230. The image processing device 205B includes the image processor 250 (including the ISP 254 and the host processor 252), the RAM 240, the ROM 245, and the I/O 260. In some cases, certain components illustrated in the image capture device 205A, such as the ISP 254 and/or the host processor 252, may be included in the image capture device 205A.

The image capture and processing system 200 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 200 can include one or more wireless transceivers for wireless communications, such as cellular network communications, 802.11 wi-fi communications, wireless local area network (WLAN) communications, or some combination thereof. In some implementations, the image capture device 205A and the image processing device 205B can be different devices. For instance, the image capture device 205A can include a camera device and the image processing device 205B can include a computing device, such as a mobile handset, a desktop computer, or other computing device.

While the image capture and processing system 200 is shown to include certain components, one of ordinary skill will appreciate that the image capture and processing system 200 can include more components than those shown in FIG. 2. The components of the image capture and processing system 200 can include software, hardware, or one or more combinations of software and hardware. For example, in some implementations, the components of the image capture and processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 200. In some examples, the image adjustment system 300 can include the image capture and processing system 200, the image capture device 205A, the image processing device 205B, or a combination thereof.

Figure 3:
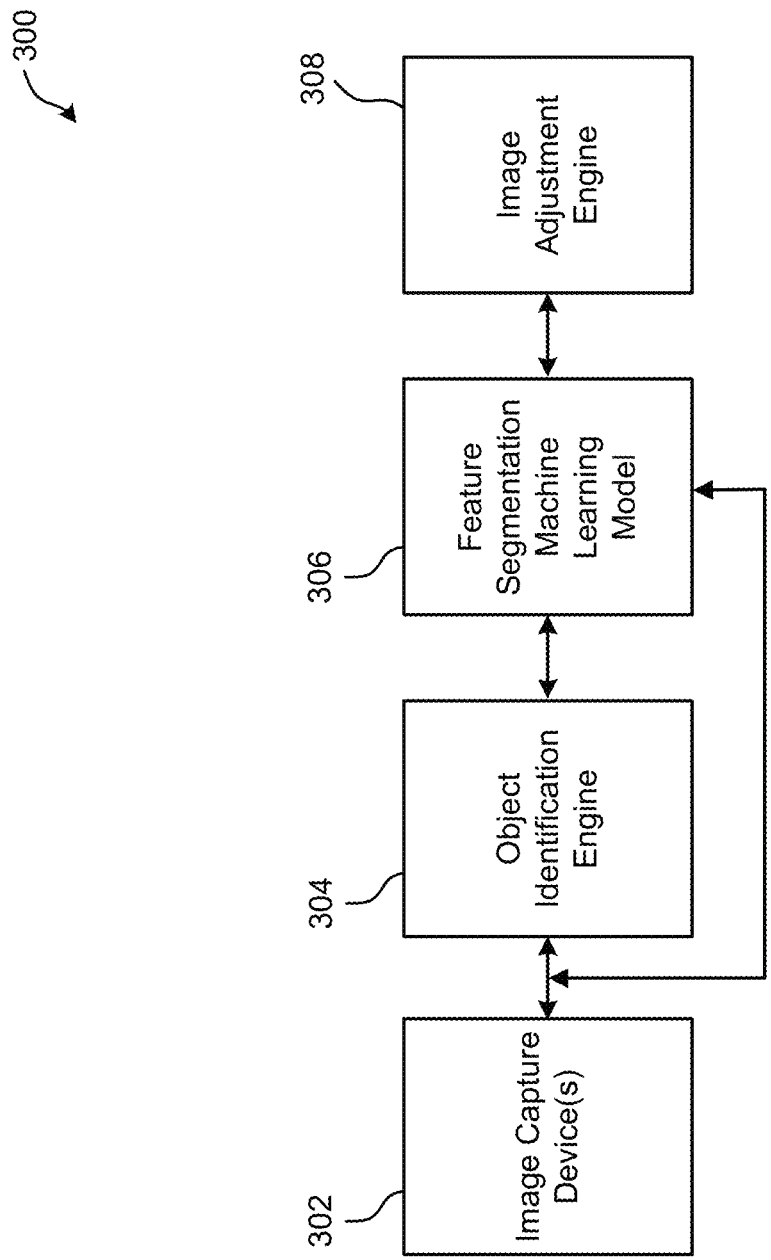
FIG. 3 is a block diagram illustrating an example image adjustment system, in accordance with some examples of the present disclosure.

FIG. 3 is a block diagram illustrating an example of an image adjustment system 300. The image adjustment system 300 includes various components that are used to process one or more images, such as removing an unwanted feature or object in the one or more images. The image adjustment system 300 can remove the unwanted feature or object and replace the color values of pixels at the location of the removed object with colors representing a portion of the scene captured in the one or more images that is occluded by the removed object. As shown, the components of the image adjustment system 300 include one or more image capture devices 302, an object identification engine 304, a feature segmentation engine 306, and an image adjustment engine 308.

In the description of FIG. 3 and image adjustment system 300 below, references to example images shown in FIG. 4A through FIG. 4F illustrate different aspects of the image adjustment performed by image adjustment system 300. In the example illustration of FIG. 4A through FIG. 4F, a person 402 is selected for adjustment (e.g., removal and/or replacement). In the illustrated example, the adjustment applied to person 402 of FIG. 4A is to remove the person from any image captured after the person 402 is identified as an unwanted object and replace the person with the background objects 404 occluded by the person 402.

Referring to FIG. 3, the image adjustment system 300 can include or be part of a mobile or stationary telephone handset (e.g., smartphone, cellular telephone, or the like), a server computer (e.g., in communication with a vehicle computing system), a desktop computer, a laptop or notebook computer, a tablet computer, a set-top box, a television, a camera, a display device, a digital media player, a video streaming device, or any other suitable electronic device. In some examples, the image adjustment system 300 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the image adjustment system 300 (e.g., the one or more image capture devices 302, the object identification engine, the feature segmentation engine 306, and the image adjustment engine 308, can be part of the same computing device. In some implementations, the components of the image adjustment system 300 can be part of two or more separate computing devices. In some cases, the image adjustment system 300 can be implemented as part of the computing system 900 shown in FIG. 9.

While the image adjustment system 300 is shown to include certain components, one of ordinary skill will appreciate that the image adjustment system 300 can include more components or fewer components than those shown in FIG. 3. In some cases, additional components of the image adjustment system 300 can include software, hardware, or one or more combinations of software and hardware. For example, in some cases, the image adjustment system 300 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 3. In some implementations, additional components of the image adjustment system 300 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image adjustment system 300.

The one or more image capture devices 302 can capture one or more images. The one or more image capture devices 302 (e.g., cameras or other image sensors) can be included in a mobile device and can be directed toward a user of the device (e.g., with one or more front facing cameras) or directed away from the user of the device (e.g., with one or more rear facing cameras).

Each of the one or more image capture devices 302 can include a camera or other type of image sensor. In some examples, the one or more image capture devices 302 can include an infrared (IR) camera configured to capture IR images and/or near-infrared (NIR) images. For example, an IR camera or sensor can capture IR signals. IR signals have wavelengths and frequencies that fall in the IR electromagnetic spectrum. The IR electromagnetic spectrum includes wavelengths in the range of 2,500 nanometers (nm) to 1 millimeter (mm), corresponding to frequencies ranging from 430 terahertz (THz) to 400 gigahertz (GHz). The infrared spectrum includes the NIR spectrum, which includes wavelengths in the range of 780 nm to 2,500 nm. In some cases, the image adjustment system 300 can include an IR sensor configured to capture IR and NIR signals. In some cases, separate IR and NIR sensors can be included in the image adjustment system 300. In some examples, the one or more image capture devices 302 can include a camera configured to capture color images and/or monochrome images. The color images can include: red-green-blue (RGB) images; luma, chroma-blue, chroma-red (YCbCr or Y'CbCr) images; and/or any other suitable type of image. In one illustrative example, the image adjustment system 300 can include an RGB camera or multiple RGB cameras. In some cases, the one or more image capture devices 302 can include one or more IR cameras and one or more RGB cameras.

In some embodiments, the one or more image capture devices 302 can include one or more depth sensors. The one or more depth sensors can obtain measurements of distance corresponding to objects in a captured scene. In one illustrative example, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of objects. In some cases, the one or more depth sensors can produce depth images that include depth values corresponding to pixel locations in one or more images captured by the one or more image capture devices 302. In some cases, the depth sensor can be located in the same general location as other sensors of the one or more image capture devices 302. In some cases, the depth sensor can capture a depth image simultaneously with an image captured by one or more other sensors included in the one or more image capture devices 302. In some implementations, the systems and techniques described herein can also be used when depth information is inferred from the one or more images.

In one illustrative example, the one or more image capture devices 302, and in some cases the one or more depth sensors, can capture one or more RGB-D images. In some cases, the one or more image capture devices 302 can capture other images types that include depth information, such as monochrome-depth, NIR-depth, or the like. For the purposes of illustration, examples of the present disclosure discuss performing image adjustment on RGB-D images, but the systems and techniques described herein can also be used with other image types that include depth information without departing from the scope of the present disclosure.

FIG. 4A illustrates an example first input image 410 of a scene. In the illustrated example, the first input image 410 includes a person 402 positioned in front of background objects 404. For example, the background objects 404 include a tree and several tents. For the purposes of the present example, an image adjustment process for removing the person 402 from images of the scene while maintaining an accurate appearance of the background objects 404 will be described.

Returning to FIG. 3, the one or more images captured by the one or more image capture devices 302 can be provided as input to the object identification engine 304. In one illustrative example, the first input image 410 of FIG. 4A can be a first input image captured by an image capture device and displayed on a display. In some cases, the first input image can be displayed to provide a user a preview of an image that will be captured after the image capture device receives a capture input (e.g., when the user presses a capture button). In the example of FIG. 4B, an identification 406 corresponding to the location of person 402 in FIG. 4A can be obtained by the object identification engine 304. For example, object identification engine 304 may obtain an indication of one or more selected objects (or ROI(s)) in the input image to be adjusted. In some cases, the indication of one or more selected objects in the input image to be adjusted may be based on a user input. In one illustrative example, a user may be able to indicate the one or more selected objects using a physical contact (e.g., tapping a screen, swiping, etc.), a gesture (e.g., detected by a camera or other sensor), using an input device, or through any other means allowing a user to interact with the image adjustment system 300.

In some cases, a pixel location of the identified object can be provided to the feature segmentation engine 306 as an input. For the purposes of illustration, a feature segmentation engine 306 based on a machine learning model (e.g., a deep learning neural network) is described below. However, it should be understood that features segmentation based on other techniques, such as computer vision, digital image processing, thresholding, region-based segmentation, edge segmentation, Otsu's algorithm, clustering algorithms, any other feature segmentation technique, or any combination thereof can be used without departing from the scope of the present disclosure. In some cases, feature segmentation engine 306 can be trained to detect spatial information (e.g., features) associated with the one or more images. In some cases, the feature segmentation engine 306 can be further trained to provide one or more classifications to objects in the one or more images based on the detected features. The feature segmentation engine 306 can in turn use the classifications to segment the image into different portions associated with the one or more classifications. For example, the feature segmentation engine 306 can segment the one or more images into different portions associated with people, buildings, cars, furniture, plants, or the like.

In some examples, the feature segmentation engine 306 can also be trained to classify objects corresponding to the features extracted from the one or more images with one or more classifications. A training dataset that includes example images and classification labels can be used to train the feature segmentation engine 306, such as using the techniques described with respect to FIG. 7 and FIG. 8 below. In one illustrative example, during inference (e.g., after the feature segmentation engine 306 has been trained), the feature segmentation engine 306 can use the feature vector to classify the one or more input images. Example classifications can include "person," "face," "building," "tree," and any other classification for which the feature segmentation engine 306 is trained to classify.

In one illustrative example, the feature segmentation engine 306 can perform semantic segmentation of the image. In semantic segmentation, the feature segmentation engine 306 can associate each object in a scene with one or more classifications (also referred to herein as labels). In some cases, if more than one object has the same label, semantic segmentation does not differentiate between the two objects. In such an example, the depth information in the one or more captured images (e.g., RGB-D images) can be used to differentiate between objects and further segment between the objects. For example, a portion containing two people in an input image can be classified with a single classifier of "person." FIG. 4B illustrates an example image 420 depicting a classifier 408 (represented as white color) associated with the person 402 in first input image 410. In some examples, the classifier 408 can represent a classification such as "person" or "face." In some aspects, with semantic segmentation, the feature segmentation engine 306 may not be able to separately identify overlapping objects as different objects.

In another illustrative example, the feature segmentation engine 306 can perform instance segmentation. In instance segmentation, the feature segmentation engine 306 can separately identify multiple instances of objects with the same classifier differently. For example, where there are multiple people in a single image such as image 100, instance segmentation can be used to differentiate between five individual people (e.g., two people 102 and people 104A, 104B, 104C) by assigning a separate classifier to each identified person. As a result, a subset of people can be selected for removal (e.g., people 104A, 104B, 104C), while a different subset of people can be kept in the final adjusted image (e.g., people 102).

In some cases, based on the features, objects, and/or classifications determined from the first input image, the object identification engine 304, the feature segmentation engine 306 and/or the image adjustment engine 308 can associate pixel positions in the input image (e.g., first input image 410 of FIG. 4A, second input image 440 of FIG. 4D) to the corresponding features, objects, and/or classifications determined by the feature segmentation engine 306 from the input image. In some cases, the pixel locations associated with the unwanted object(s) can be provided to the image adjustment engine 308 as an input. In some cases, features, objects, and/or classifications associated with the unwanted object(s) can be stored in storage (not shown) and used to identify the unwanted object in subsequent images.

Once the image adjustment engine 308 obtains pixel locations associated with the unwanted object(s) from the object identification engine 304 and/or the feature segmentation engine 306, the image adjustment engine 308 can adjust the pixel locations associated with the unwanted object(s) in each image. In some cases, based on the identified pixel locations, the image adjustment engine 308 can remove and/or replace unwanted objects to form an adjusted image.

In some cases, the image adjustment engine 308 can perform an inpainting process to replace the pixels that were previously occupied by the unwanted object in the input image. In some cases, the image adjustment engine 308 can obtain one or more additional images of the same scene or portion of the scene as the first input image. In some cases, the pixels obscured by the unwanted object(s) (e.g., person 402) in the first input image may not be obscured in another image of the scene or portion of the scene processed by the image adjustment system 300. In some cases, unobscured pixel information corresponding to the location of the unwanted object in the first input image can be used to replace the unwanted object in a first adjusted image. For example, pixels from two or more images can be combined to generate the adjusted image (e.g., image fusion). FIG. 4C illustrates a first adjusted image 430 where the unwanted object (e.g., person 402) has been removed and replaced (e.g., at location 412 of FIG. 4C) by the image adjustment engine 308 of the image adjustment system 300.

In some cases, once an unwanted object is identified, classified, and/or removed by the image adjustment system 300, the features, objects, and/or classifications associated with the unwanted object(s) can be retrieved from storage (not shown) and used to identify the unwanted object(s) in subsequent images.

FIG. 4D illustrates a second input image 440 that also includes the same person 402 in a different location in the same scene captured in FIG. 4A. In some cases, the feature segmentation engine 306 can determine a classifier 408 for the person 402 from the second image 440. Accordingly, image 450 shown in FIG. 4E illustrates an identification 416 of the person 402 at the new location in the second input image. In some cases, the object identification engine 304 can obtain the classification generated by the feature segmentation engine 306 and determine that the identified object matches is a common object present in both the first input image 410 and the second input image 440. Based on the identification of the unwanted object in the second input image 440 by the object identification engine 304, the image adjustment engine 308 can remove and/or replace the person 402 from the background objects 404 to generate a second adjusted image 460 as shown in FIG. 4F. In the illustrated example of FIG. 4F, the replaced pixels 418 can correspond to unobscured pixels from a corresponding location in the first input image 410 and/or the first adjusted image 430 as indicated by the white outline 414. As additional images are obtained from the one or more image capture devices 302, the image adjustment system 300 can track identified unwanted objects in a similar fashion and remove and/or replace the unwanted objects.

Although examples described herein are provided in terms of identifying and removing unwanted objects, in some cases, target objects can be identified that are desired for inclusion in an adjusted image, and the image adjustment system 300 can determine whether any objects not identified as target objects are present in the scene. For example, the object identification engine 304 and/or feature segmentation engine 306 can determine whether objects in the scene that were not identified as target objects have moved and identify the moved objects as objects for removal. In another example technique, depth information captured by the one or more image capture devices 302 can be used to determine unwanted objects. For example, if the depth of the target object exceeds the depth of another detected object (e.g., detected by the object identification engine 304) by a threshold amount, then the other detected object can be identified as an unwanted object. Regardless of the technique used to identify the target objects and/or unwanted objects, the systems and techniques described herein can be used to remove and/or replace the unwanted object(s) from an adjusted image.

In some cases, the object identification engine 304 can obtain additional inputs to guide identification of objects as target objects and/or unwanted objects. For example, the object identification engine 304 can obtain user inputs and/or audio inputs to guide object identification. In one illustrative example, a user input can include recognizing only family members, friends, and/or pets. For example, the object identification engine 304 may be trained to recognize people, places, pets, or the like from a photo album stored on a storage device (not shown). In another illustrative example, object identification engine 304 can obtain user gaze information to determine a region of interest) corresponding to the user gaze. In some implementations, the object identification engine 304 can determine that objects outside of the region of interest are unwanted objects. In some cases, the object identification engine 304 can identify target objects within the region of interest. In another illustrative example, the object identification engine 304 can obtain audio input corresponding to an input image to determine target objects and/or unwanted objects. For example, the object identification engine 304 can determine that captured audio corresponds to a family member, friend, pet, and/or the like and determine a region of interest in the captured image corresponding to the source of the captured audio. In another illustrative example, the object identification engine 304 can determine that captured audio corresponds to an unrecognized person or pet and identify one or more unwanted objects in the captured image corresponding to the source of the captured audio.

In the illustrated example, FIG. 3 illustrates the object identification engine 304 separately from feature segmentation machine engine 306, in some cases, identifying one or more objects for removal and/or one or more target objects can be performed after an input image is segmented by the feature segmentation engine 306. For example, the feature segmentation engine 306 can be trained to identify people, places, pets, or the like as a target object in an input image.

For example, the feature segmentation engine 306 may be trained to recognize features in an input image that correspond to a previously photographed person, place, pet, or the like. In some cases, the objective identification engine can obtain features determined by the feature segmentation engine 306 as an input and can determine unwanted objects in the scene captured in an input image based on other factors such as motion of the object between subsequent images.

In some cases, the image adjustment system 300 may obtain multiple images of the scene or a portion of the scene captured in an input image (e.g., first input image 410 of FIG. 4A, second input image 440 of FIG. 4D). For example, an electronic device may include a first image capture device and a second image capture device (e.g., included in the one or more image capture devices 302) that simultaneously capture at least a partial common portion of the scene. In some cases, the object identification engine 304 can determine target objects and/or unwanted objects based on images obtained from the first image capture device and remove and/or replace unwanted objects from images obtained from the second image capture device. In one illustrative example, the first image capture device can have a lower resolution and/or lower power consumption than the second image capture device. For example, the first image capture device can include an always-on (AON) camera. In some cases, a single image sensor may capture multiple images of the scene to provide, for example, a zero shutter lag (ZSL) capture, preview images, or the like.

Figure 5:
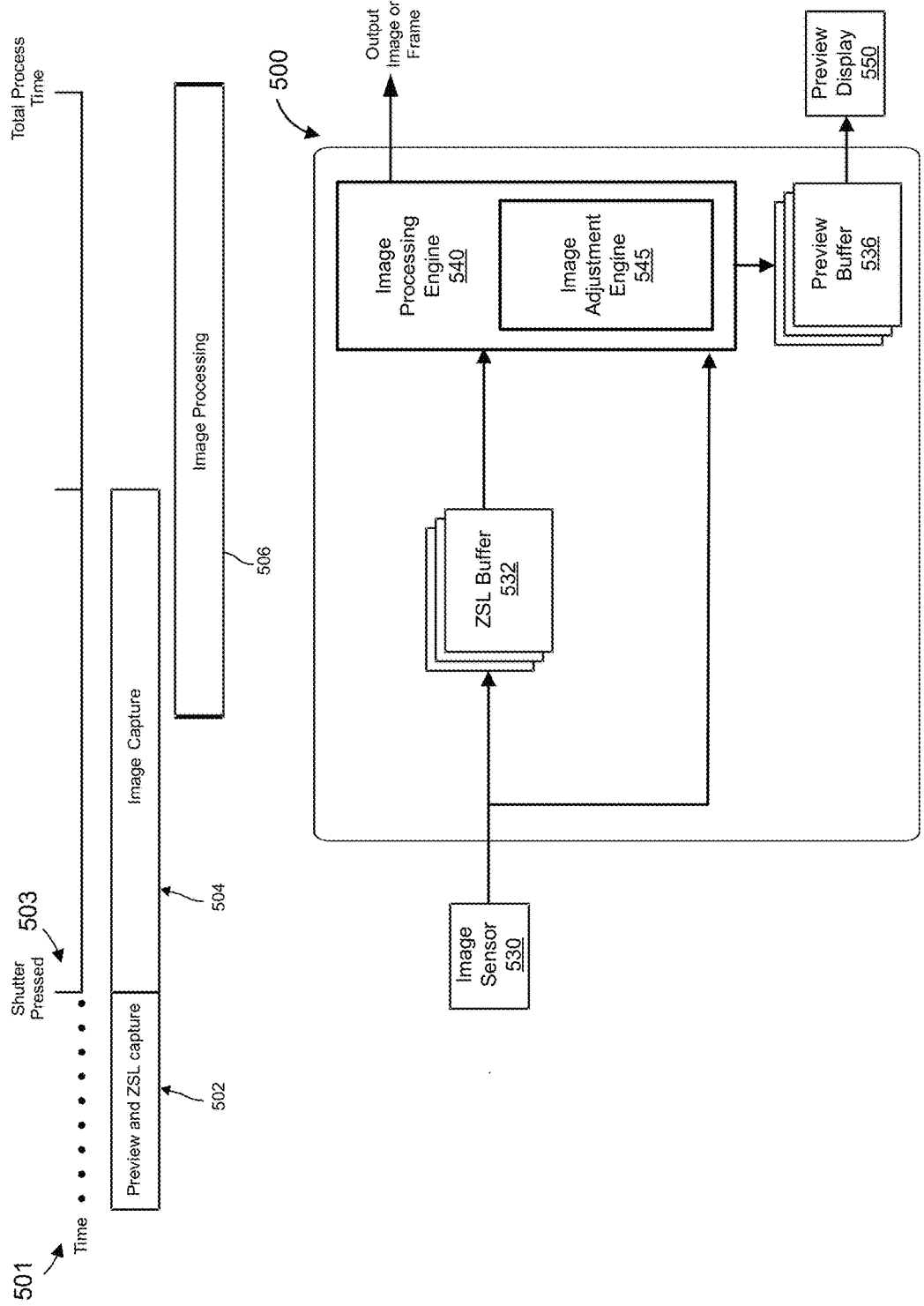
FIG. 5 is a block diagram illustrating an example image capture system including an image adjustment system, in accordance with some examples of the present disclosure.

FIG. 5 is a block diagram illustrating an example image capture system 500. As illustrated, the image capture system 500 includes a ZSL buffer 532, an image processing engine 540, an image adjustment engine 545, and a preview buffer 536. The image adjustment engine 545 can correspond to image adjustment system 300 shown in FIG. 3. It should be understood that image capture system 500 is an example block diagram provided for the purpose of illustration and that more or fewer components can be included without departing from the scope of the present disclosure. In addition, although the image adjustment engine 545 is illustrated as being included in image processing engine 540, the image adjustment engine 545 can be separate from the image processing engine 540 without departing from the scope of the present disclosure.

As shown in FIG. 5, a timeline 501 for an example image capture sequence includes a capture event 503 (e.g., a capture input). In the illustrated example, images from an image sensor 530 (e.g., image sensor 230 of FIG. 2, one or more image capture devices 302 of FIG. 3, etc.) can be captured during a preview and ZSL period 502 before the capture event 503. In addition, after the capture event 503, an image capture period 504 can include capturing images after the capture event 503. In the illustrated example of FIG. 5, the image capture system 500 can be configured to provide preview images with unwanted objects removed in preview images (e.g., prior to receiving a capture input). In some cases, the image capture system 500 can provide the preview images before, during and/or after the capture event 503.

In some implementations, the image capture system 500 can obtain image from image sensor 530, which can correspond to the one or more image capture devices 302 of FIG. 3. As shown, a zero shutter lag (ZSL) buffer 532 can be used to store images or frames captured by the image sensor 530. In some examples, the ZSL buffer 532 is a circular buffer. In general, the ZSL buffer 532 can be used to store one or more frames recently captured by the sensor, which can compensate for lag time that may occur, until the image capture system 500 finishes encoding and storing a frame in response to a shutter (or capture) command being received (e.g., based on user input or automatically received). The ZSL buffer 532 can be coupled to image processing engine 540 to perform image processing on images prior to the images being output and stored to a storage device (e.g., by storage device 930 of FIG. 9). For example, the image processing engine 540 can perform image processing on an image in response to the capture event 503.

In some cases, the image processing engine 540 can generate preview images and output the preview images to a preview buffer 536. For example, the image processing engine 540 can generate preview images by downscaling and/or cropping raw image data from the image sensor 530 to match the size of a preview display (e.g., a display of an electronic device). In some cases, as described above, the image adjustment engine 545 can identify an unwanted object in a preview image (e.g., based on user input or automatically determined). In some cases, once the unwanted object is identified, the image adjustment engine 545 can remove and/or replace the unwanted object from the preview images and provide adjusted preview images to the preview buffer 536. As a result, images output to the preview display 550 can provide an indication of what a captured image will look like with the unwanted object(s) removed. In some cases, the image adjustment engine 545 can utilize an inpainting process to replace pixels associated with an unwanted object during the preview and ZSL period 502. For example, an inpainting process using interpolation may be used to avoid latency associated with combining pixels from multiple images. In some cases, segmentation (e.g., by feature segmentation engine 306 of FIG. 3) can be performed on downscaled and/or cropped preview images to determine the location of the unwanted object(s). In some cases, each preview image stored in the preview buffer 536 can be indexed to a corresponding image stored in the ZSL buffer 532. In some cases, the segmentation provided by the feature segmentation engine 306 can be stored in the preview buffer 536 in addition or alternatively to the preview images.

In some cases, after the capture event 503 occurs, the image processing engine 540 can obtain an image from the ZSL buffer 532 to process and output to storage (referred to as the processed image herein). In some case, the processing of the processed image can occur during an image processing period 506. As noted above, each image in the ZSL buffer 532 can be indexed to a corresponding preview image and/or segmentation in the preview buffer 536. In some cases, the segmentation determined for the preview images can be re-used by the image adjustment engine 545 to identify the pixels of the processed image that correspond to the unwanted object(s). In some cases, when the unwanted object(s) are located at different positions in the scene in the images stored in the ZSL buffer 532, pixels that are obscured by the unwanted object(s) in the processed image can be replaced with corresponding pixels (e.g., at the obscured pixel locations) from other images in the ZSL buffer 532 that were not obscured by the unwanted object(s). However, in some cases, none of the images stored in the ZSL buffer 532 may include an unobstructed view of some or all of the pixels obstructed in the processed image. For example, if an unwanted object remains stationary for an extended period of time, the ZSL buffer may not include any images that are free of the unwanted object. In such cases, the image adjustment engine 545 can utilize an inpainting technique as described above with respect to FIG. 3 to replace the obstructed pixels. In some cases, the image adjustment engine 545 can combine pixels from multiple images (e.g., image fusion), perform inpainting, perform any other technique for replacing pixels of an image, and/or any combination thereof.

In one illustrative example, an image capture system 500 can be configured to use inpainting to remove unwanted objects during preview and ZSL period 502. In some examples, the image capture system 500 can combine pixels from multiple images for unwanted object(s) that moved during the period of time captured in the ZSL buffer 532 and perform inpainting for any other pixels obscured by the unwanted object(s). However, any combination of pixel replacement techniques can be used during preview and ZSL period 502, image capture period 504, image processing period 506, and or any other operational periods of an image capture device without departing from the scope of the present disclosure.

As noted above, the image adjustment system 300 and related techniques described herein can be utilized to remove unwanted objects from images captured by an image capture device (e.g., a camera). In addition, using the techniques described herein, a photographer can be provided with a preview image displayed on a display that reflects the scene with the unwanted object(s) removed. In some cases, unwanted objects can also be automatically identified (e.g., by a machine learning model) and removed from a captured image, thereby preventing the need for post-processing. In addition, because the systems and techniques described herein can be used to combine pixel information from multiple images stored in an image buffer (e.g., ZSL buffer 532 of FIG. 5), an accurate reproduction of the captured scene without the unwanted object(s) can be generated by the image adjustment system and techniques. In some cases, to preserve system resources, other object removal and replacement techniques such as inpainting can be used to preserve system resources. For example, an inpainting technique can be used during a preview period (e.g., before a capture input is received). In some cases, the preview images may not ultimately be stored on a storage device, image quality can be sacrificed in favor of low latency so that the preview image is more likely to match a captured image processed after a capture input is received.

Figure 6:
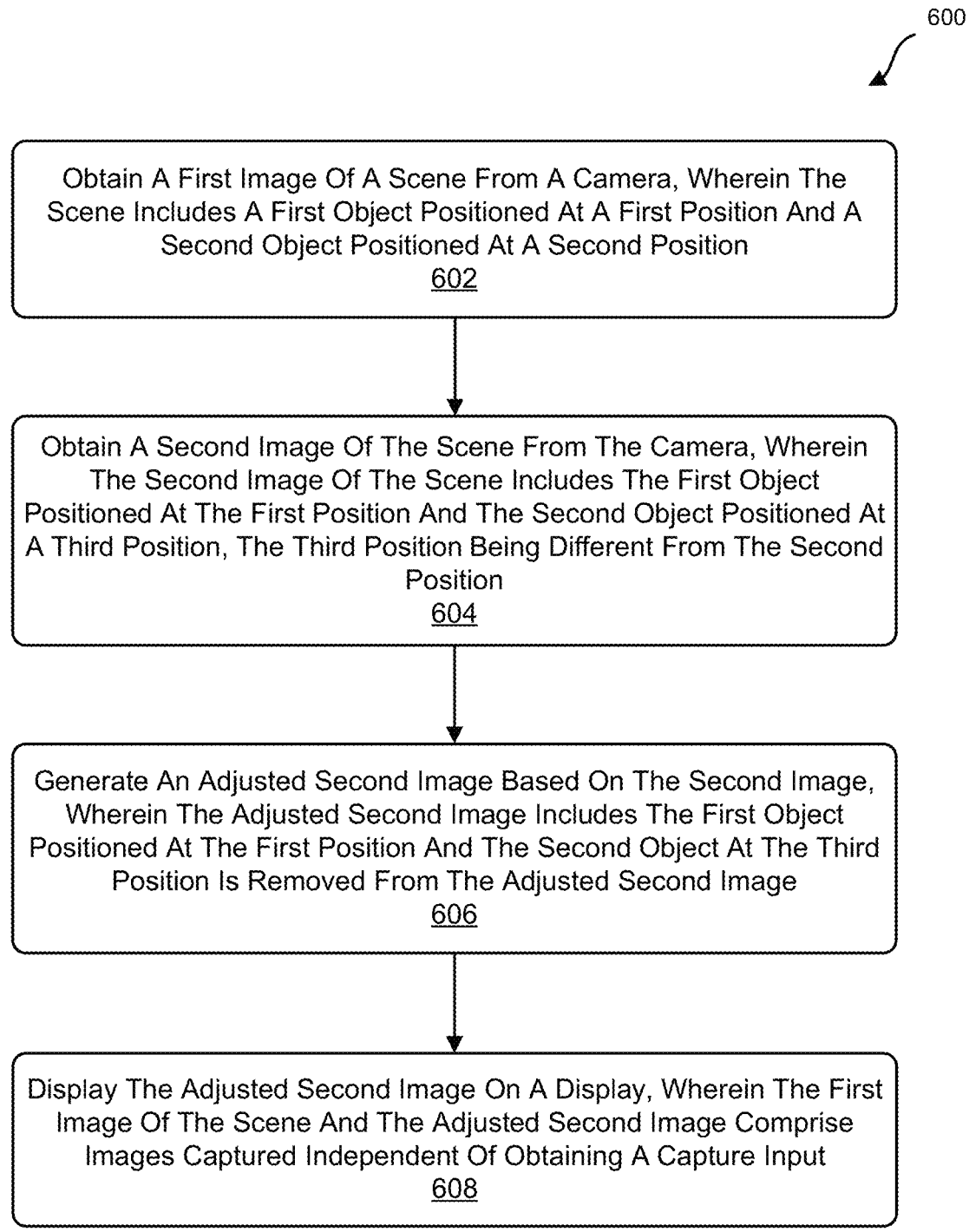
FIG. 6 is a flow diagram illustrating an example image adjustment process, in accordance with some examples of the present disclosure.

FIG. 6 is a flow diagram illustrating an example of a process 600 of processing one or more images. At block 602, the process 600 includes obtaining a first image of a scene from a camera (e.g., one or more image capture devices 302). In some cases, the scene includes a first object positioned at a first position and a second object positioned at a second position (see FIG. 4B).

At block 604, the process 600 includes obtaining a second image of the scene from the camera. In some examples, the second image of the scene includes the first object positioned at the first position and the second object positioned at a third position, the third position being different from the second position (see FIG. 4E). In some cases, the first image of the scene and the second image of the scene are preview images (e.g., stored in preview buffer 536 of FIG. 5) obtained prior to obtaining a capture input. In some examples, the second image of the scene is an image obtained subsequent to obtaining the capture input.

At block 606, the process 600 includes generating an adjusted second image based on the second image (e.g., by image adjustment engine 308). In some cases, the adjusted second image includes the first object positioned at the first position and the second object at the third position is removed from the adjusted second image (see FIG. 4F). In some cases, removing the second object from the adjusted second image comprises interpolating colors of pixels of the second image to generate pixel data for one or more pixels associated with the second object in the second image of the scene. In some examples, removing the second object from the adjusted second image comprises obtaining pixels of the first image of the scene associated with the third position and replacing corresponding pixels of the second image of the scene associated with the third position.

At block 608, the process 600 includes displaying the adjusted second image on a display (e.g., preview display 550 of FIG. 5). In some examples, the first image of the scene and the adjusted second image comprise images captured independent of obtaining a capture input (e.g., preview images).

In some examples, the process 600 includes obtaining a third image of the scene from the camera, obtaining the capture input, and generating, based on obtaining the capture input, a capture image based on the third image of the scene.

In some implementations, the process 600 includes, subsequent to displaying the first image of the scene on the display, obtaining an input associated with selecting the second object for removal from the scene. In some examples, the input associated with selecting the second object for removal from the scene includes at least one or more of a physical contact, a gesture, a gaze direction, an input from an input device, or an audio input. In some examples, the process 600 includes obtaining an input associated with selecting the first object as a target object for inclusion in the adjusted second image. In some implementations, the input associated with selecting the first object as the target object for inclusion in the adjusted second image includes at least one or more of a physical contact, a gesture, a gaze direction, an input from an input device, or an audio input.

In some cases, the process 600 includes determining the second object is an unwanted object (e.g., by object identification engine 304 of FIG. 3). In some cases, determining the second object is an unwanted object includes at least one or more of determining that the second object moved between the first image of the scene and the second image of the scene, determining that the first object is a previously photographed object and the second object is not a previously photographed object, determining a depth of the first object and a depth of the second object are different by greater than a threshold depth difference amount, determining the second object is outside of a region of interest based on a gaze direction or, determining an audio input associated with the second object is indicative of an unwanted object.

In some cases, the process 600 includes obtaining a capture input. In some examples, the process 600 includes obtaining a third image of the scene. In some aspects, the third image of the scene includes the first object at the first position and the second object. In some cases, the process 600 includes determining a fourth position of the second object in the scene. In some implementations, the process 600 includes generating an adjusted third image including the first object at the first position. In some cases, the second object is removed from the adjusted third image. In some examples, the process 600 includes storing the adjusted third image. In some implementations, the process 600 includes obtaining a segmentation (e.g., by feature segmentation engine 306 of FIG. 3) associated with the second object and the first image of the scene, associating the third image of the scene with the first image of the scene, and applying the segmentation associated with the second object and the first image of the scene to the third image of the scene. In some examples, the first image has a first resolution (e.g., a preview image in preview buffer 536 of FIG. 5) and the third image has a second resolution (e.g., an image in ZSL buffer 532 of FIG. 5), the second resolution being different from the first resolution. In some examples, generating the adjusted second image includes performing an inpainting process to remove the second object from the second image of the scene and generating the adjusted third image includes combining pixels of a fourth image of the scene associated with the fourth position with pixels of the third image of the scene. In some examples, the pixels of the fourth image of the scene associated with the fourth position include a portion of the scene obscured by the second object in the third image of the scene.

In some cases, the process 600 includes obtaining a fourth image of the scene from the camera, wherein the scene includes the first object positioned at the first position and the second object positioned at the second position. In some examples, the fourth image of the scene includes an image captured independent of obtaining the capture input. In some implementations, the process 600 includes generating an adjusted fourth image based on the fourth image. In some examples, the adjusted fourth image includes the first object positioned at the first position and the second object is removed from the adjusted fourth image. In some aspects, the process 600 includes displaying the adjusted fourth image on the display. In some examples, the process 600 includes obtaining an input associated with removing the second object based on the first image of the scene. In some implementations, the process 600 includes obtaining a fifth image of the scene from the camera, obtaining the capture input, and generating, based on obtaining the capture input, a capture image based on the fifth image of the scene. In some examples, the capture image includes the first object positioned at the first position and the second object positioned at the second position is removed from the capture image. In some implementations, the process 600 includes storing the capture image.

In some examples, the processes described herein (e.g., process 600 and/or other process described herein) may be performed by a computing device or apparatus. In one example, one or more of the processes can be performed by the image adjustment system 300 of FIG. 3. In another example, one or more of the processes can be performed by the computing system 900 shown in FIG. 9. For instance, a computing device with the computing system 900 shown in FIG. 9 can include the components of the image adjustment system 300 and can implement the operations of the process 600 of FIG. 6 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 600 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
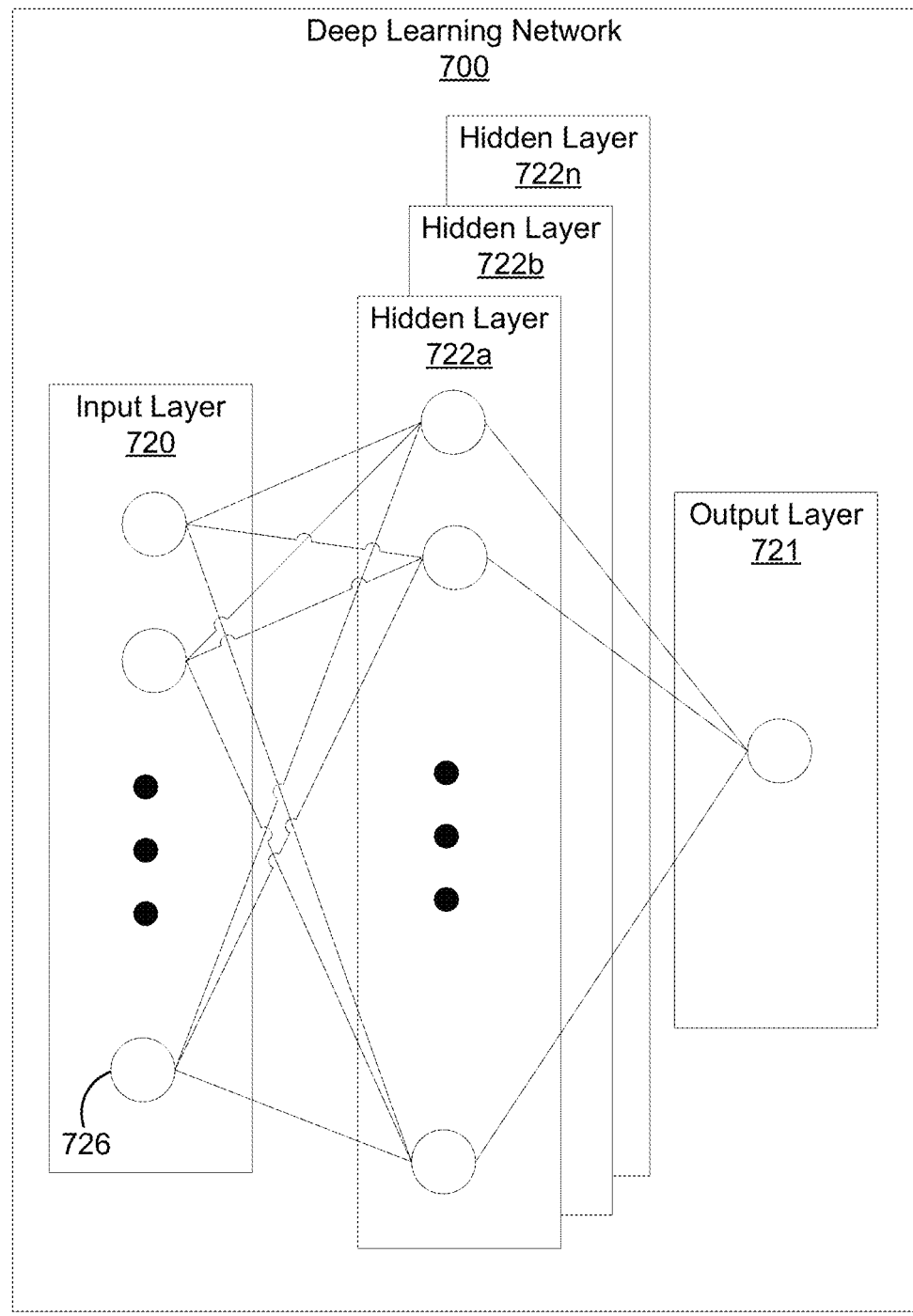
FIG. 7 is a block diagram illustrating an example of a deep learning network, in accordance with some examples.

As noted above, various aspects of the present disclosure can use machine learning models or systems. FIG. 7 is an illustrative example of a deep learning neural network 700 that can be used to implement the machine learning based feature segmentation, instance segmentation, depth estimation and/or classification described above. An input layer 720 includes input data. In one illustrative example, the input layer 720 can include data representing the pixels of an input image. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 721 that provides an output resulting from the processing performed by the hidden layers 722a, 722b, through 722n. In one illustrative example, the output layer 721 can provide a classification for an object in an input image (e.g., first input image 410 of FIG. 4A, second input image 440 of FIG. 4D). The classification can include a class identifying the type of activity (e.g., looking up, looking down, closing eyes, yawning, etc.).

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721. In an example in which the neural network 700 is used to identify features in images, the neural network 700 can be trained using training data that includes both images and labels, as described above. For instance, training images can be input into the network, with each training image having a label indicating the features in the images (for the feature segmentation machine learning system) or a label indicating classes of an activity in each image. In one example using object classification for illustrative purposes, a training image can include an image of a number 2, in which case the label for the image can be [0 0 1 0 0 0 0 0 0 0].

In some cases, the neural network 700 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of identifying objects in images, the forward pass can include passing a training image through the neural network 700. The weights are initially randomized before the neural network 700 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \Sigma \frac{1}{2}(\text{target} - output)^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 700 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 700 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

Figure 8:
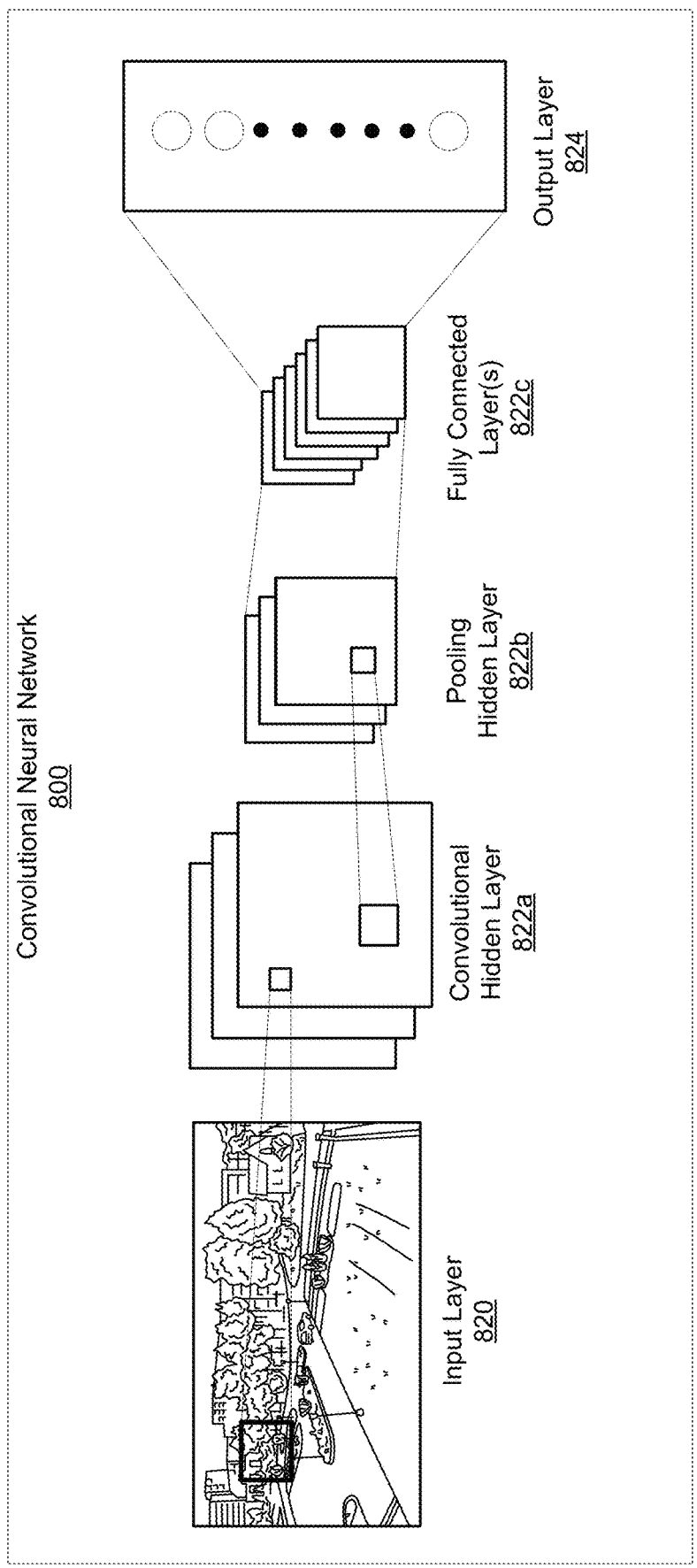
FIG. 8 is a block diagram illustrating an example of a convolutional neural network, in accordance with some examples.

FIG. 8 is an illustrative example of a convolutional neural network (CNN) 800. The input layer 820 of the CNN 800 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822b can take each activation map output from the convolutional hidden layer 822a and generates a condensed activation map (or feature map) using a pooling function. Max-pooling is one example of a function performed by a pooling hidden layer. Other forms of pooling functions be used by the pooling hidden layer 822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 822a. In the example shown in FIG. 8, three pooling filters are used for the three activation maps in the convolutional hidden layer 822a.

In some examples, max-pooling can be used by applying a max-pooling filter (e.g., having a size of 2×2) with a stride (e.g., equal to a dimension of the filter, such as a stride of 2) to an activation map output from the convolutional hidden layer 822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822*a* having a dimension of 24×24 nodes, the output from the pooling hidden layer 822*b* will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 822*b* to every one of the output nodes in the output layer 824. Using the example above, the input layer includes 28×28 nodes encoding the pixel intensities of the input image, the convolutional hidden layer 822*a* includes 3×24×24 hidden feature nodes based on application of a 5×5 local receptive field (for the filters) to three activation maps, and the pooling hidden layer 822*b* includes a layer of 3×12×12 hidden feature nodes based on application of max-pooling filter to 2×2 regions across each of the three feature maps. Extending this example, the output layer 824 can include ten output nodes. In such an example, every node of the 3×12×12 pooling hidden layer 822*b* is connected to every node of the output layer 824.

The fully connected layer 822*c* can obtain the output of the previous pooling hidden layer 822*b* (which should represent the activation maps of high-level features) and determines the features that most correlate to a particular class. For example, the fully connected layer 822*c* layer can determine the high-level features that most strongly correlate to a particular class, and can include weights (nodes) for the high-level features. A product can be computed between the weights of the fully connected layer 822*c* and the pooling hidden layer 822*b* to obtain probabilities for the different classes. For example, if the CNN 800 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10). M indicates the number of classes that the CNN 800 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 9:
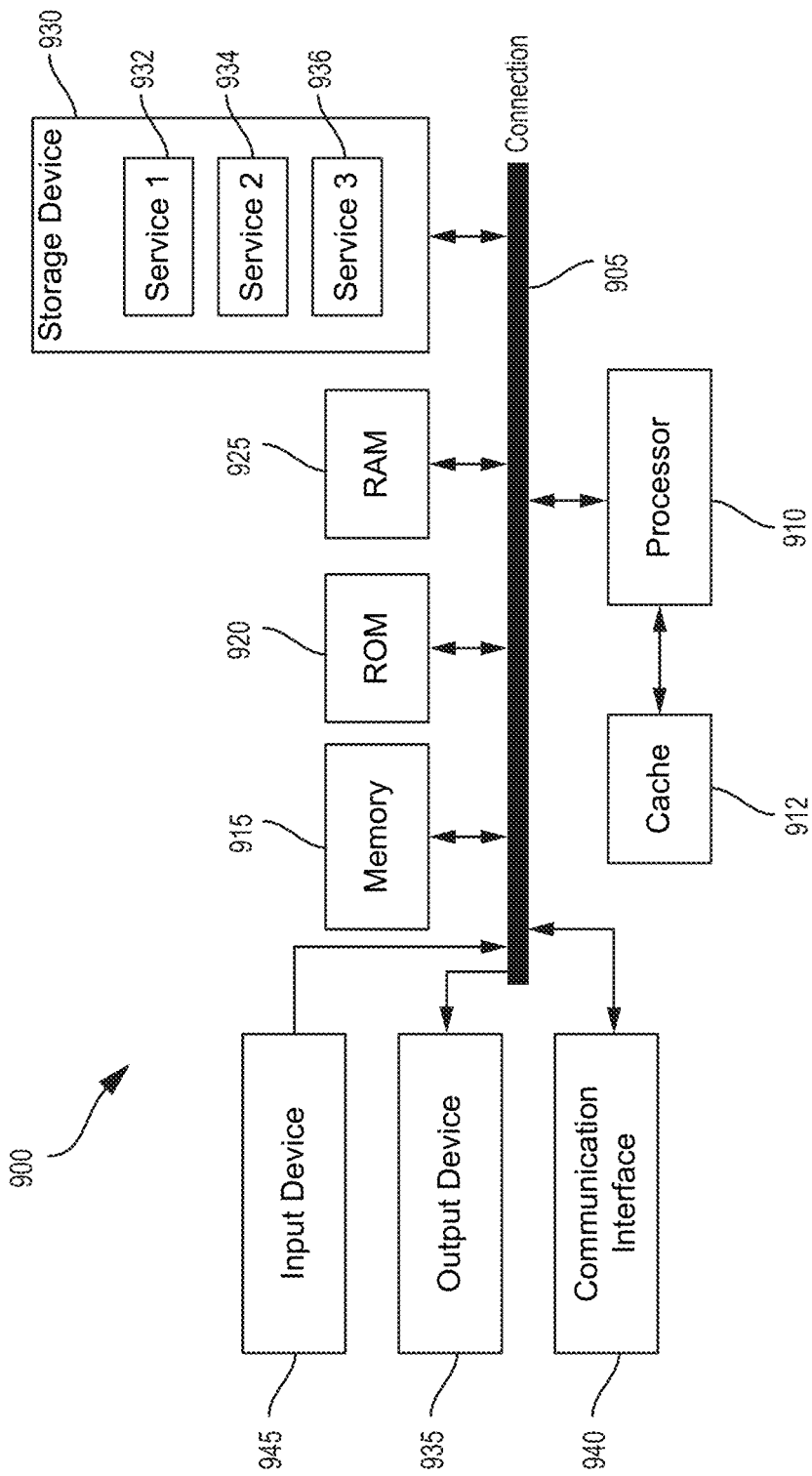
FIG. 9 is a diagram illustrating an example of a computing system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for processing one or more images. The apparatus includes a memory (e.g., implemented in circuitry) and a processor (or multiple processors) coupled to the memory. The processor (or processors) is configured to: obtain a first image of a scene from a camera, wherein the scene includes a first object positioned at a first position and a second object positioned at a second position; obtain a second image of the scene from the camera, wherein the second image of the scene includes the first object positioned at the first position and the second object positioned at a third position, the third position being different from the second position; generate an adjusted second image based on the second image, wherein the adjusted second image includes the first object positioned at the first position and the second object at the third position is removed from the adjusted second image; and display the adjusted second image on a display, wherein the first image of the scene and the adjusted second image comprise images captured independent of obtaining a capture input.

Aspect 2: The apparatus of Aspect 1, wherein the processor is configured to: obtain a third image of the scene from the camera; obtain the capture input; and generate, based on obtaining the capture input, a capture image based on the third image of the scene, wherein the capture image includes the first object positioned at the first position and the second object positioned at the third position is removed from the capture image.

Aspect 3: The apparatus of any of Aspects 1 to 2, wherein the second image of the scene and the third image of the scene are associated with a common identifier.

Aspect 4: The apparatus of any of Aspects 1 to 3, wherein the third image of the scene comprises an image obtained prior to the capture input, wherein the third image of the scene is stored in the at least one memory.

Aspect 5: The apparatus of any of Aspects 1 to 4, wherein the at least one memory comprises a zero shutter lag (ZSL) buffer.

Aspect 6: The apparatus of any of Aspects 1 to 5, wherein the processor is configured to: obtain an input associated with selecting the second object for removal from the scene.

Aspect 7: The apparatus of any of Aspects 1 to 6, wherein the processor is configured to: obtain an input associated with selecting the first object as a target object for inclusion in the adjusted second image.

Aspect 8: The apparatus of any of Aspects 1 to 7, wherein the input associated with selecting the first object as the target object for inclusion in the adjusted second image comprises at least one or more of a physical contact, a gesture, a gaze direction, an input from an input device, or an audio input.

Aspect 9: The apparatus of any of Aspects 1 to 8, wherein the processor is configured to: determine the second object is an unwanted object, wherein determining the second object is an unwanted object comprises at least one or more of: determining that the second object moved between the first image of the scene and the second image of the scene; determining that the first object is a previously photographed object and the second object is not a previously photographed object; or determine a depth of the first object and a depth of the second object are different by greater than a threshold depth difference amount.

Aspect 10: The apparatus of any of Aspects 1 to 9, wherein removing the second object from the adjusted second image comprises interpolating colors of pixels of the second image to generate pixel data for one or more pixels associated with the second object in the second image of the scene.

Aspect 11: The apparatus of any of Aspects 1 to 10, wherein removing the second object from the adjusted second image comprises obtaining pixels of the first image of the scene associated with the third position and replacing corresponding pixels of the second image of the scene associated with the third position.

Aspect 12: The apparatus of any of Aspects 1 to 11, wherein the first image of the scene and the second image of the scene are preview images obtained prior to obtaining a capture input.

Aspect 13: The apparatus of any of Aspects 1 to 12, wherein the second image of the scene is an image obtained subsequent to obtaining the capture input.

Aspect 14: The apparatus of any of Aspects 1 to 13, wherein the processor is configured to: obtaining a capture input; obtain a third image of the scene, wherein the third image of the scene includes the first object at the first position and the second object; determine a fourth position of the second object in the scene; generate an adjusted third image including the first object at the first position, wherein the second object is removed from the adjusted third image; and storing the third image.

Aspect 15: The apparatus of any of Aspects 1 to 14, wherein the processor is configured to: obtain a segmentation associated with the second object and the first image of the scene; associate the third image of the scene with the first image of the scene; and apply the segmentation associated with the second object and the first image of the scene to the third image of the scene.

Aspect 16: The apparatus of any of Aspects 1 to 15, wherein the first image has a first resolution and the third image has a second resolution, the second resolution being different from the first resolution.

Aspect 17: The apparatus of any of Aspects 1 to 16, wherein, to generate the adjusted second image, the at least one processor is configured to: perform an inpainting process to remove the second object from the second image of the scene; and generate the adjusted third image comprises combining pixels of a fourth image of the scene associated with the fourth position with pixels of the third image of the scene, wherein the pixels of the fourth image of the scene associated with the fourth position include a portion of the scene obscured by the second object in the third image of the scene.

Aspect 18: The apparatus of any of Aspects 1 to 17, wherein the third image and the fourth image are stored in a ZSL buffer.

Aspect 19: The apparatus of any of Aspects 1 to 18, wherein the processor is configured to: obtain a fourth image of the scene from the camera, wherein the scene includes the first object positioned at the first position and the second object positioned at the second position, wherein the fourth image of the scene comprises an image captured independent of obtaining the capture input; generate an adjusted fourth image based on the fourth image, wherein the adjusted fourth image includes the first object positioned at the first position and the second object is removed from the adjusted fourth image; and display the adjusted fourth image on the display.

Aspect 20: The apparatus of any of Aspects 1 to 19, wherein the processor is configured to: obtain an input associated with removing the second object based on the first image of the scene.

Aspect 21: The apparatus of any of Aspects 1 to 20, wherein the second object is removed based on an inpainting process.

Aspect 22: The apparatus of any of Aspects 1 to 21, wherein the processor is configured to: obtain a fifth image of the scene from the camera; obtain the capture input; and generate, based on obtaining the capture input, a capture image based on the fifth image of the scene, wherein the capture image includes the first object positioned at the first position and the second object positioned at the second position is removed from the capture image; and store the capture image in the at least one memory.

Aspect 23. A method of processing one or more images, comprising: obtaining a first image of a scene from a camera, wherein the scene includes a first object positioned at a first position and a second object positioned at a second position; obtaining a second image of the scene from the camera, wherein the second image of the scene includes the first object positioned at the first position and the second object positioned at a third position, the third position being different from the second position; generating an adjusted second image based on the second image, wherein the adjusted second image includes the first object positioned at the first position and the second object at the third position is removed from the adjusted second image; and displaying the adjusted second image on a display, wherein the first image of the scene and the adjusted second image comprise images captured independent of obtaining a capture input.

Aspect 24. The method of Aspect 23, further comprising: obtaining a third image of the scene from the camera; obtaining the capture input; and generating, based on obtaining the capture input, a capture image based on the third image of the scene, wherein the capture image includes the first object positioned at the first position and the second object positioned at the third position is removed from the capture image.

Aspect 25. The method of any of Aspects 23 to 24, wherein the second image of the scene and the third image of the scene are associated with a common identifier.

Aspect 26. The method of any of Aspects 23 to 25, wherein the third image of the scene comprises an image obtained prior to the capture input, wherein the third image of the scene is stored in a memory.

Aspect 27. The method of any of Aspects 23 to 26, wherein the memory comprises a zero shutter lag (ZSL) buffer.

Aspect 28. The method of any of Aspects 23 to 27, further comprising, subsequent to displaying the first image of the scene on the display, obtaining an input associated with selecting the second object for removal from the scene.

Aspect 29. The method of any of Aspects 23 to 28, further comprising obtaining an input associated with selecting the first object as a target object for inclusion in the adjusted second image.

Aspect 30. The method of any of Aspects 23 to 29, wherein the input associated with selecting the first object as the target object for inclusion in the adjusted second image comprises at least one or more of a physical contact, a gesture, a gaze direction, an input from an input device, or an audio input.

Aspect 31. The method of any of Aspects 23 to 30, further comprising determining the second object is an unwanted object, wherein determining the second object is an unwanted object comprises at least one or more of: determining that the second object moved between the first image of the scene and the second image of the scene; determining that the first object is a previously photographed object and the second object is not a previously photographed object; or determining a depth of the first object and a depth of the second object are different by greater than a threshold depth difference amount.

Aspect 32. The method of any of Aspects 23 to 31, wherein removing the second object from the adjusted second image comprises interpolating colors of pixels of the second image to generate pixel data for one or more pixels associated with the second object in the second image of the scene.

Aspect 33. The method of any of Aspects 23 to 32, wherein removing the second object from the adjusted second image comprises obtaining pixels of the first image of the scene associated with the third position and replacing corresponding pixels of the second image of the scene associated with the third position.

Aspect 34. The method of any of Aspects 23 to 33, wherein the first image of the scene and the second image of the scene are preview images obtained prior to obtaining a capture input.

Aspect 35. The method of any of Aspects 23 to 34, wherein the second image of the scene is an image obtained subsequent to obtaining the capture input.

Aspect 36. The method of any of Aspects 23 to 35, further comprising: obtaining a capture input; obtaining a third image of the scene, wherein the third image of the scene includes the first object at the first position and the second object; determining a fourth position of the second object in the scene; generating an adjusted third image including the first object at the first position, wherein the second object is removed from the adjusted third image; and storing the third image.

Aspect 37. The method of any of Aspects 23 to 36, further comprising: obtaining a segmentation associated with the second object and the first image of the scene; associating the third image of the scene with the first image of the scene; and applying the segmentation associated with the second object and the first image of the scene to the third image of the scene.

Aspect 38. The method of any of Aspects 23 to 37, wherein the first image has a first resolution and the third image has a second resolution, the second resolution being different from the first resolution.

Aspect 39. The method of any of Aspects 23 to 38, wherein generating the adjusted second image comprises performing an inpainting process to remove the second object from the second image of the scene; and generating the adjusted third image comprises combining pixels of a fourth image of the scene associated with the fourth position with pixels of the third image of the scene, wherein the pixels of the fourth image of the scene associated with the fourth position include a portion of the scene obscured by the second object in the third image of the scene.

Aspect 40. The method of any of Aspects 23 to 39, wherein the third image and the fourth image are stored in a ZSL buffer.

Aspect 41. The method of any of Aspects 23 to 40, further comprising: obtaining a fourth image of the scene from the camera, wherein the scene includes the first object positioned at the first position and the second object positioned at the second position, wherein the fourth image of the scene comprises an image captured independent of obtaining the capture input; generating an adjusted fourth image based on the fourth image, wherein the adjusted fourth image includes the first object positioned at the first position and the second object is removed from the adjusted fourth image; and displaying the adjusted fourth image on the display.

Aspect 42. The method of any of Aspects 23 to 41, further comprising obtaining an input associated with removing the second object based on the first image of the scene.

Aspect 43. The method of any of Aspects 23 to 42, wherein the second object is removed based on an inpainting process.

Aspect 44. The method of any of Aspects 23 to 43, further comprising: obtaining a fifth image of the scene from the camera; obtaining the capture input; and generating, based on obtaining the capture input, a capture image based on the fifth image of the scene, wherein the capture image includes the first object positioned at the first position and the second object positioned at the second position is removed from the capture image; and storing the capture image.

Aspect 45: A non-transitory computer-readable storage medium having stored thereon instructions which, when executed by one or more processors, cause the one or more processors to perform any of the operations of aspects 1 to 44.

Aspect 46: An apparatus comprising one or more means for performing any of the operations of aspects 1 to 44.

What is claimed is:

1. An apparatus for processing one or more images, comprising:
at least one memory; and
at least one processor coupled to the at least one memory and configured to:
obtain a first image of a scene from a camera, wherein the scene includes a first object positioned at a first position and a second object positioned at a second position;
obtain a second image of the scene from the camera, wherein the second image of the scene includes the first object positioned at the first position and the second object positioned at a third position, the third position being different from the second position;
determine that the second object is an unwanted object based on at least one of a determination that a depth of the first object positioned at the first position in the first image is different from a depth of the second object positioned at the second position in the first image by greater than a threshold depth difference amount or a determination that a depth of the first object positioned at the first position in the second image is different from a depth of the second object positioned at the third position in the second image by greater than the threshold depth difference amount;
generate, based on determining that the second object is the unwanted object, an adjusted second image based on the second image, wherein the adjusted second image includes the first object positioned at the first position and the second object at the third position is removed from the adjusted second image; and
display the adjusted second image on a display, wherein the first image of the scene and the adjusted second image comprise images captured independent of obtaining a capture input.

2. The apparatus of claim 1, wherein the at least one processor is configured to: obtain a third image of the scene from the camera;
obtain the capture input; and
generate, based on obtaining the capture input, a capture image based on the third image of the scene, wherein the capture image includes the first object positioned at the first position and the second object positioned at the third position is removed from the capture image.

3. The apparatus of claim 2, wherein the second image of the scene and the third image of the scene are associated with a common identifier.

4. The apparatus of claim 3, wherein the third image of the scene comprises an image obtained prior to the capture input, wherein the third image of the scene is stored in the at least one memory.

5. The apparatus of claim 4, wherein the at least one memory comprises a zero shutter lag (ZSL) buffer.

6. The apparatus of claim 1, wherein the at least one processor is configured to:
obtain an input associated with selecting the second object for removal from the scene; and
determine that the second object is the unwanted object further based on the input associated with selecting the second object for removal from the scene.

7. The apparatus of claim 1, wherein the at least one processor is configured to:
obtain an input associated with selecting the first object as a target object for inclusion in the adjusted second image; and
include the first object in the adjusted second image based on obtaining the input.

8. The apparatus of claim 7, wherein the input associated with selecting the first object as the target object for inclusion in the adjusted second image comprises at least one or more of a physical contact, a gesture, a gaze direction, an input from an input device, or an audio input.

9. The apparatus of claim 1, wherein, to determine the second object is the unwanted object, the at least one processor is further configured to:
determine that the first object is a previously photographed object and the second object is not a previously photographed object.

10. The apparatus of claim 1, wherein, to remove the second object from the adjusted second image, the at least one processor is configured to interpolate colors of pixels of the second image to generate pixel data for one or more pixels associated with the second object in the second image of the scene.

11. The apparatus of claim 1, wherein, to remove the second object from the adjusted second image, the at least one processor is configured to obtain pixels of the first image of the scene associated with the third position and replacing corresponding pixels of the second image of the scene associated with the third position.

12. The apparatus of claim 1, wherein the first image of the scene and the second image of the scene are preview images obtained prior to obtaining a capture input.

13. The apparatus of claim 1, wherein the second image of the scene is an image obtained subsequent to obtaining the capture input.

14. The apparatus of claim 1, wherein the at least one processor is configured to:
obtain a capture input;
obtain a third image of the scene, wherein the third image of the scene includes the first object at the first position and the second object;
determine a fourth position of the second object in the scene; and
generate an adjusted third image including the first object at the first position, wherein the second object is removed from the adjusted third image; and storing the third image.

15. The apparatus of claim 14, wherein the at least one processor is configured to:
obtain a segmentation associated with the second object and the first image of the scene;
associate the third image of the scene with the first image of the scene; and
apply the segmentation associated with the second object and the first image of the scene to the third image of the scene.

16. The apparatus of claim 15, wherein the first image has a first resolution and the third image has a second resolution, the second resolution being different from the first resolution.

17. The apparatus of claim 14, wherein, to generate the adjusted second image, the at least one processor is configured to:
perform an inpainting process to remove the second object from the second image of the scene; and
generate the adjusted third image comprises combining pixels of a fourth image of the scene associated with the fourth position with pixels of the third image of the scene, wherein the pixels of the fourth image of the scene associated with the fourth position include a portion of the scene obscured by the second object in the third image of the scene.

18. The apparatus of claim 1, wherein the at least one processor is configured to:
obtain a fourth image of the scene from the camera, wherein the scene includes the first object positioned at the first position and the second object positioned at the second position, wherein the fourth image of the scene comprises an image captured independent of obtaining the capture input;
generate an adjusted fourth image based on the fourth image, wherein the adjusted fourth image includes the first object positioned at the first position and the second object is removed from the adjusted fourth image; and
display the adjusted fourth image on the display.

19. The apparatus of claim 18, wherein the at least one processor is configured to:
obtain an input associated with removing the second object based on the first image of the scene.

20. The apparatus of claim 18, wherein the at least one processor is configured to:
obtain a fifth image of the scene from the camera;
obtain the capture input;
generate, based on obtaining the capture input, a capture image based on the fifth image of the scene, wherein the capture image includes the first object positioned at the first position and the second object positioned at the second position is removed from the capture image; and
store the capture image in the at least one memory.

21. The apparatus of claim 1, wherein, to determine that the second object is the unwanted object, the at least one processor is configured to determine whether the depth of the first object positioned at the first position in the first image is different from the depth of the second object positioned at the second position in the first image by greater than the threshold depth difference amount.

22. The apparatus of claim 1, wherein, to determine that the second object is the unwanted object, the at least one processor is configured to determine whether the depth of the first object positioned at the first position in the second image is different from the depth of the second object positioned at the third position in the second image by greater than the threshold depth difference amount.

23. A method of processing one or more images, comprising:
obtaining a first image of a scene from a camera, wherein the scene includes a first object positioned at a first position and a second object positioned at a second position;
obtaining a second image of the scene from the camera, wherein the second image of the scene includes the first object positioned at the first position and the second object positioned at a third position, the third position being different from the second position;
determining that the second object is an unwanted object based on at least one of a determination that a depth of the first object positioned at the first position in the first image is different from a depth of the second object positioned at the second position in the first image by greater than a threshold depth difference amount or a determination that a depth of the first object positioned at the first position in the second image is different from a depth of the second object positioned at the third position in the second image by greater than the threshold depth difference amount;
generating, based on determining that the second object is the unwanted object, an adjusted second image based on the second image, wherein the adjusted second image includes the first object positioned at the first position and the second object at the third position is removed from the adjusted second image; and
displaying the adjusted second image on a display, wherein the first image of the scene and the adjusted second image comprise images captured independent of obtaining a capture input.

24. The method of claim 23, further comprising:
obtaining a third image of the scene from the camera;
obtaining the capture input; and
generating, based on obtaining the capture input, a capture image based on the third image of the scene, wherein the capture image includes the first object positioned at the first position and the second object positioned at the third position is removed from the capture image.

25. The method of claim 24, wherein the second image of the scene and the third image of the scene are associated with a common identifier.

26. The method of claim 25, wherein the third image of the scene comprises an image obtained prior to the capture input, wherein the third image of the scene is stored in a memory.

27. The method of claim 26, wherein the memory comprises a zero shutter lag (ZSL) buffer.

28. The method of claim 23, further comprising, subsequent to displaying the first image of the scene on the display, obtaining an input associated with selecting the second object for removal from the scene, wherein determining the second object is the unwanted object is further based on the input associated with selecting the second object for removal from the scene.

29. The method of claim 23, further comprising:
obtaining an input associated with selecting the first object as a target object for inclusion in the adjusted second image; and
include the first object in the adjusted second image based on obtaining the input.

30. The method of claim 29, wherein the input associated with selecting the first object as the target object for inclusion in the adjusted second image comprises at least one or more of a physical contact, a gesture, a gaze direction, an input from an input device, or an audio input.

31. The method of claim 29, wherein determining the second object is an unwanted object comprises:
determining that the first object is a previously photographed object and the second object is not a previously photographed object.

32. The method of claim 23, wherein removing the second object from the adjusted second image comprises interpolating colors of pixels of the second image to generate pixel data for one or more pixels associated with the second object in the second image of the scene.

33. The method of claim 23, wherein removing the second object from the adjusted second image comprises obtaining pixels of the first image of the scene associated with the third position and replacing corresponding pixels of the second image of the scene associated with the third position.

34. There method of claim 23, wherein the first image of the scene and the second image of the scene are preview images obtained prior to obtaining a capture input.

35. The method of claim 23, wherein the second image of the scene is an image obtained subsequent to obtaining the capture input.

36. The method of claim 23, further comprising:
obtaining a capture input;
obtaining a third image of the scene, wherein the third image of the scene includes the first object at the first position and the second object;
determining a fourth position of the second object in the scene;
generating an adjusted third image including the first object at the first position, wherein the second object is removed from the adjusted third image; and
storing the adjusted third image.

37. The method of claim 36, further comprising:
obtaining a segmentation associated with the second object and the first image of the scene; and
associating the third image of the scene with the first image of the scene; and applying the segmentation associated with the second object and the first image of the scene to the third image of the scene.

38. The method of claim 37, wherein the first image has a first resolution and the third image has a second resolution, the second resolution being different from the first resolution.

39. The method of claim 36, wherein:
generating the adjusted second image comprises performing an inpainting process to remove the second object from the second image of the scene; and
generating the adjusted third image comprises combining pixels of a fourth image of the scene associated with the fourth position with pixels of the third image of the scene, wherein the pixels of the fourth image of the scene associated with the fourth position include a portion of the scene obscured by the second object in the third image of the scene.

40. The method of claim 23, further comprising:
obtaining a fourth image of the scene from the camera, wherein the scene includes the first object positioned at the first position and the second object positioned at the second position, wherein the fourth image of the scene comprises an image captured independent of obtaining the capture input;
generating an adjusted fourth image based on the fourth image, wherein the adjusted fourth image includes the first object positioned at the first position and the second object is removed from the adjusted fourth image; and
displaying the adjusted fourth image on the display.

41. The method of claim 40, further comprising obtaining an input associated with removing the second object based on the first image of the scene.

42. The method of claim 40, further comprising:
obtaining a fifth image of the scene from the camera;
obtaining the capture input; and
generating, based on obtaining the capture input, a capture image based on the fifth image of the scene, wherein the capture image includes the first object positioned at the first position and the second object positioned at the second position is removed from the capture image; and
storing the capture image.

43. The method of claim 23, wherein determining that the second object is the unwanted object comprises determining whether the depth of the first object positioned at the first position in the first image is different from the depth of the second object positioned at the second position in the first image by greater than the threshold depth difference amount.

44. The method of claim 23, wherein determining that the second object is the unwanted object comprises determining whether the depth of the first object positioned at the first position in the second image is different from the depth of the second object positioned at the third position in the second image by greater than the threshold depth difference amount.

* * * * *